(12) United States Patent
Byeon et al.

(10) Patent No.: US 11,972,763 B2
(45) Date of Patent: Apr. 30, 2024

(54) METHOD AND APPARATUS FOR SUPPORTING VOICE AGENT IN WHICH PLURALITY OF USERS PARTICIPATE

(71) Applicant: Samsung Electronics Co., Ltd., Suwon-si (KR)

(72) Inventors: Jooyong Byeon, Suwon-si (KR); Jinwoo Park, Suwon-si (KR); Juwan Lee, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/422,690

(22) PCT Filed: Sep. 18, 2020

(86) PCT No.: PCT/KR2020/012633
§ 371 (c)(1),
(2) Date: Jul. 13, 2021

(87) PCT Pub. No.: WO2021/085855
PCT Pub. Date: May 6, 2021

(65) Prior Publication Data
US 2022/0122603 A1 Apr. 21, 2022

(30) Foreign Application Priority Data
Nov. 1, 2019 (KR) .......................... 10-2019-0138670

(51) Int. Cl.
*G10L 15/22* (2006.01)
*G10L 15/26* (2006.01)

(52) U.S. Cl.
CPC .............. *G10L 15/22* (2013.01); *G10L 15/26* (2013.01)

(58) Field of Classification Search
CPC ...... G10L 15/22; G10L 15/26; G10L 15/1822; G10L 15/18
(Continued)

(56) References Cited

U.S. PATENT DOCUMENTS

| 2010/0036929 A1 | 2/2010 | Scherpa et al. |
| 2012/0022857 A1 | 1/2012 | Baldwin et al. |

(Continued)

FOREIGN PATENT DOCUMENTS

| CN | 110070868 A | 7/2019 |
| KR | 10-2012-0042006 A | 5/2012 |

(Continued)

OTHER PUBLICATIONS

International Search Report and Written Opinion of the International Searching Authority in connection with International Application No. PCT/KR2020/012633 dated Dec. 15, 2020, 9 pages.

*Primary Examiner* — George C Monikang

(57) ABSTRACT

Various embodiments of the disclosure provide an electronic device and a method of operating the same, the electronic device including: a speech recognition module; a memory configured to store information corresponding to a plurality of domains related to a collaborative task; and a processor operatively connected to the speech recognition module or the memory, wherein the processor is configured to receive a user voice from a user, analyze the received user voice using the speech recognition module to determine whether or not to perform a collaborative task, if the collaborative task is determined to be performed, select at least one participant related to the collaborative task, collect information related to the collaborative task from the user or an electronic device of the selected participant, and perform the collaborative task, based on the collected information. Various embodiments may be provided.

14 Claims, 17 Drawing Sheets

(58) Field of Classification Search
USPC .................................. 704/9, 231, 246, 251
See application file for complete search history.

(56) References Cited

U.S. PATENT DOCUMENTS

| | | |
|---|---|---|
| 2015/0149173 A1 | 5/2015 | Korycki |
| 2015/0149182 A1 | 5/2015 | Kalns et al. |
| 2015/0179168 A1 | 6/2015 | Hakkani-Tur et al. |
| 2016/0335532 A1 | 11/2016 | Sanghavi et al. |
| 2019/0109880 A1 | 4/2019 | Phillips et al. |

FOREIGN PATENT DOCUMENTS

| | | |
|---|---|---|
| KR | 10-1475990 B1 | 12/2014 |
| KR | 10-2019-0040735 A | 4/2019 |

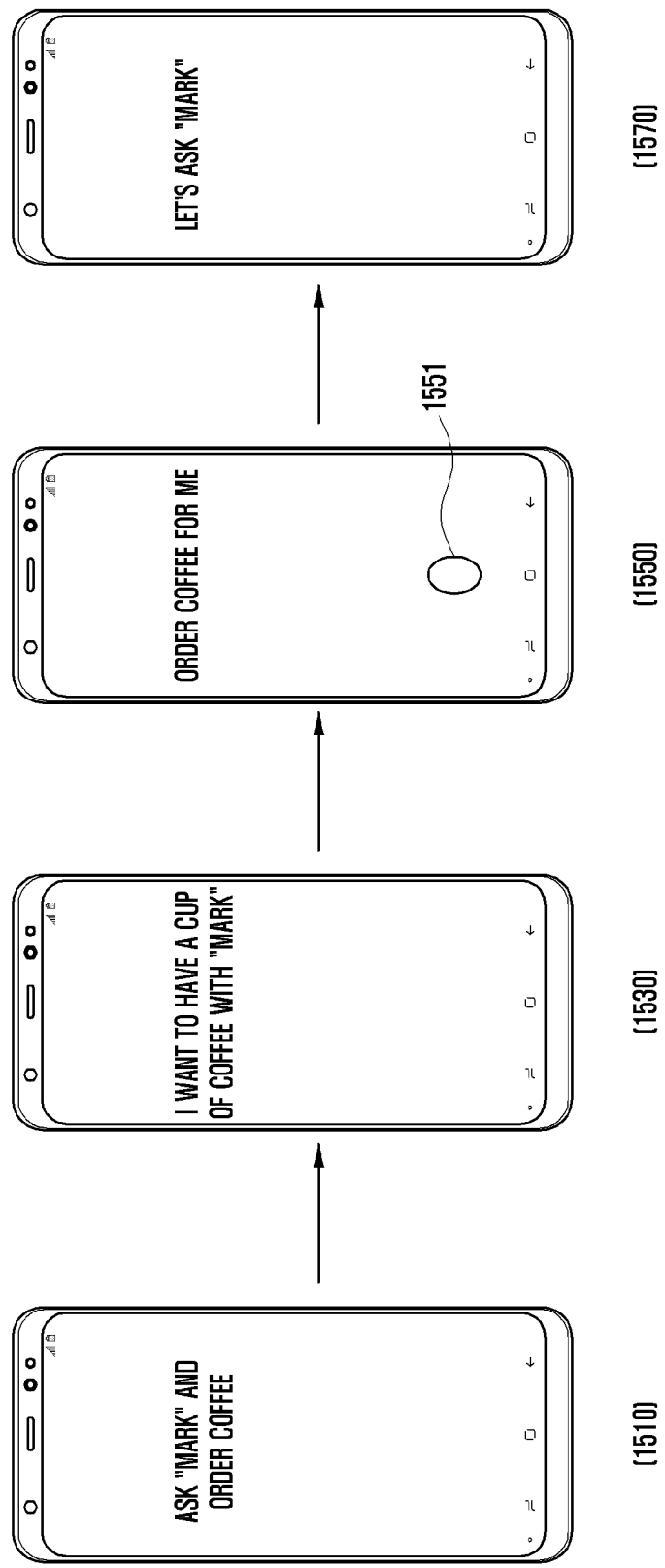

METHOD AND APPARATUS FOR SUPPORTING VOICE AGENT IN WHICH PLURALITY OF USERS PARTICIPATE

TECHNICAL FIELD

Various embodiments of the disclosure relate to a method and a device for supporting a voice agent in which a plurality of users participate.

BACKGROUND ART

In line with the development of digital technology, various types of electronic devices such as mobile communication terminals, personal digital assistants (PDAs), electronic organizers, smart phones, tablet personal computers (PCs), and wearable devices are widely used. In order to support and expand functions of the electronic devices, hardware and/or software of the electronic devices is constantly being improved.

For example, the electronic device may control the electronic device or execution of an application, or may execute a function using a web-based service through a user's voice command using speech recognition technology. Speech recognition (voice recognition) technology may be a technology for recognizing a voice uttered by a user (e.g., a person) and converting the same into code information capable of being handled by an electronic device. Specifically, speech recognition technology may include processes of inputting a speech waveform, identifying a word or a word string, and extracting a meaning. This speech recognition technology is applied to automobiles and the IoT (Internet of Things) technologies, as well as to the electronic devices, and is utilized in various ways.

Speech recognition technology according to the prior art supports only users who directly give commands to the electronic devices. There is a need for a method of performing speech recognition for voice commands of a third party, as well as the user of the electronic device, thereby providing appropriate functions.

DISCLOSURE OF INVENTION

Technical Problem

Various embodiments may provide a method and a device capable of collecting information from a third party along with a user's voice command and performing an appropriate function.

Various embodiments may provide a method and a device capable of collecting information necessary for executing a user's voice command from a third party and performing a function.

Solution to Problem

An electronic device according to various embodiments may include: a speech recognition module; a memory configured to store information corresponding to a plurality of domains related to a collaborative task; and a processor operatively connected to the speech recognition module or the memory, wherein the processor may be configured to receive a user voice from a user, analyze the received user voice using the speech recognition module to determine whether to perform the collaborative task, if the collaborative task is determined to be performed, select at least one participant related to the collaborative task, collect information related to the collaborative task from the user or an electronic device of the selected participant, and perform the collaborative task, based on the collected information.

A method of operating an electronic device according to various embodiments may include: receiving a user voice from a user, analyzing the received user voice to determine whether to perform a collaborative task, if the collaborative task is determined to be performed, selecting at least one participant related to the collaborative task, collecting information related to the collaborative task from the user or an electronic device of the selected participant, and performing the collaborative task, based on the collected information.

Advantageous Effects of Invention

According to various embodiments, it is possible to perform an appropriate function by collecting information from a third party along with a user's voice command.

According to various embodiments, it is possible to execute a function by collecting information necessary for executing a user's voice command from a third party.

According to various embodiments, it is possible to combine a user's voice command and a third party's voice command and to then provide a single final service by adding a collaboration module to a voice agent system (or engine) to enable participation of a third party.

BRIEF DESCRIPTION OF DRAWINGS

FIG. 15 illustrates a diagram of an example in which an electronic device receives a user voice for a collaborative task according to various embodiments.

MODE FOR CARRYING OUT THE INVENTION

Figure 1:
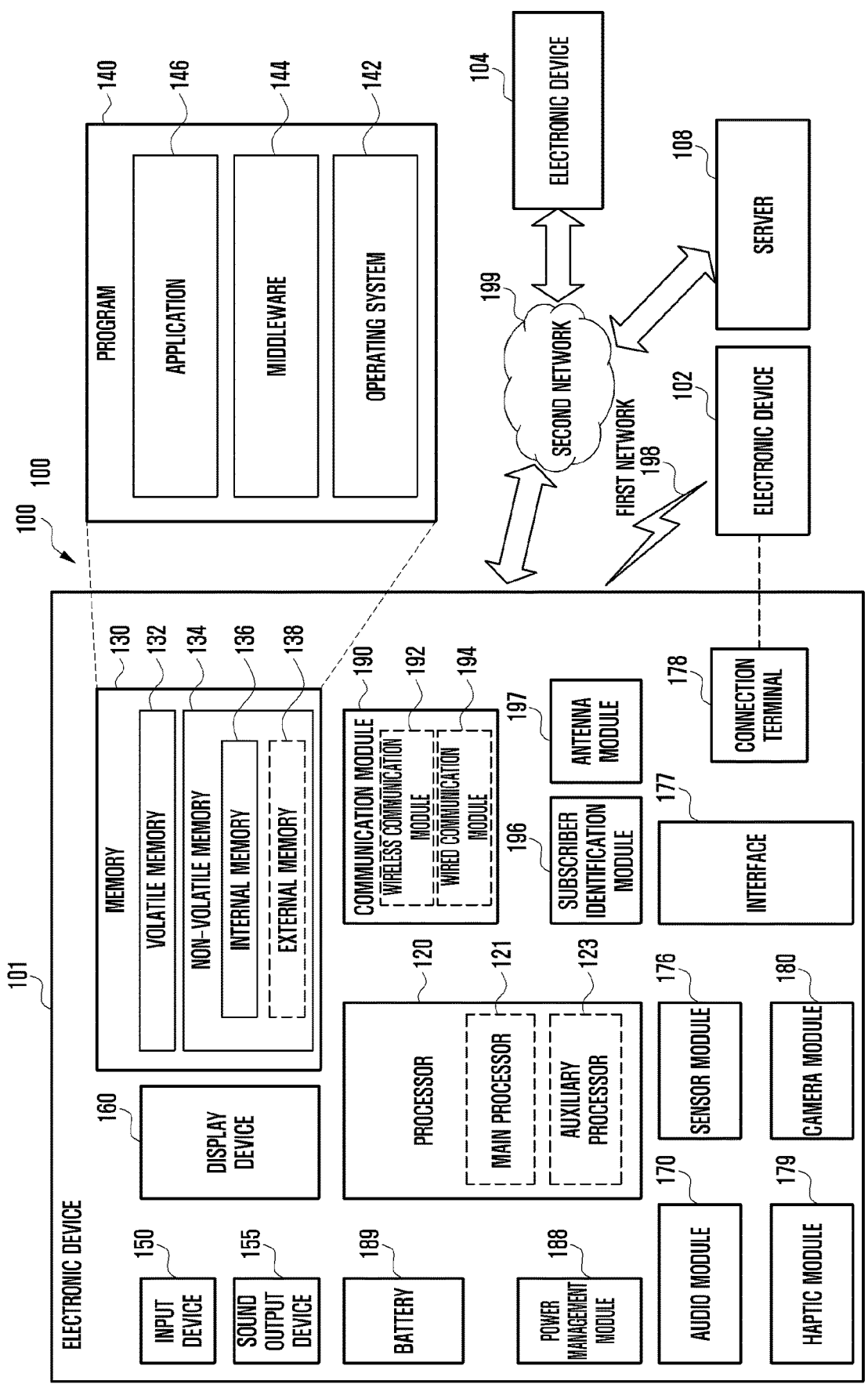
FIG. 1 illustrates a block diagram of an electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 illustrates a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. The camera module 180 may be one or more modules for acquiring different signals such as RGB, IR, and time of flight (TOF), and may be a combination thereof. For example, the camera module 180 may be in the form of a stereo camera for acquiring two RGB images or may be a stereo camera in which RGB and TOF are combined.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
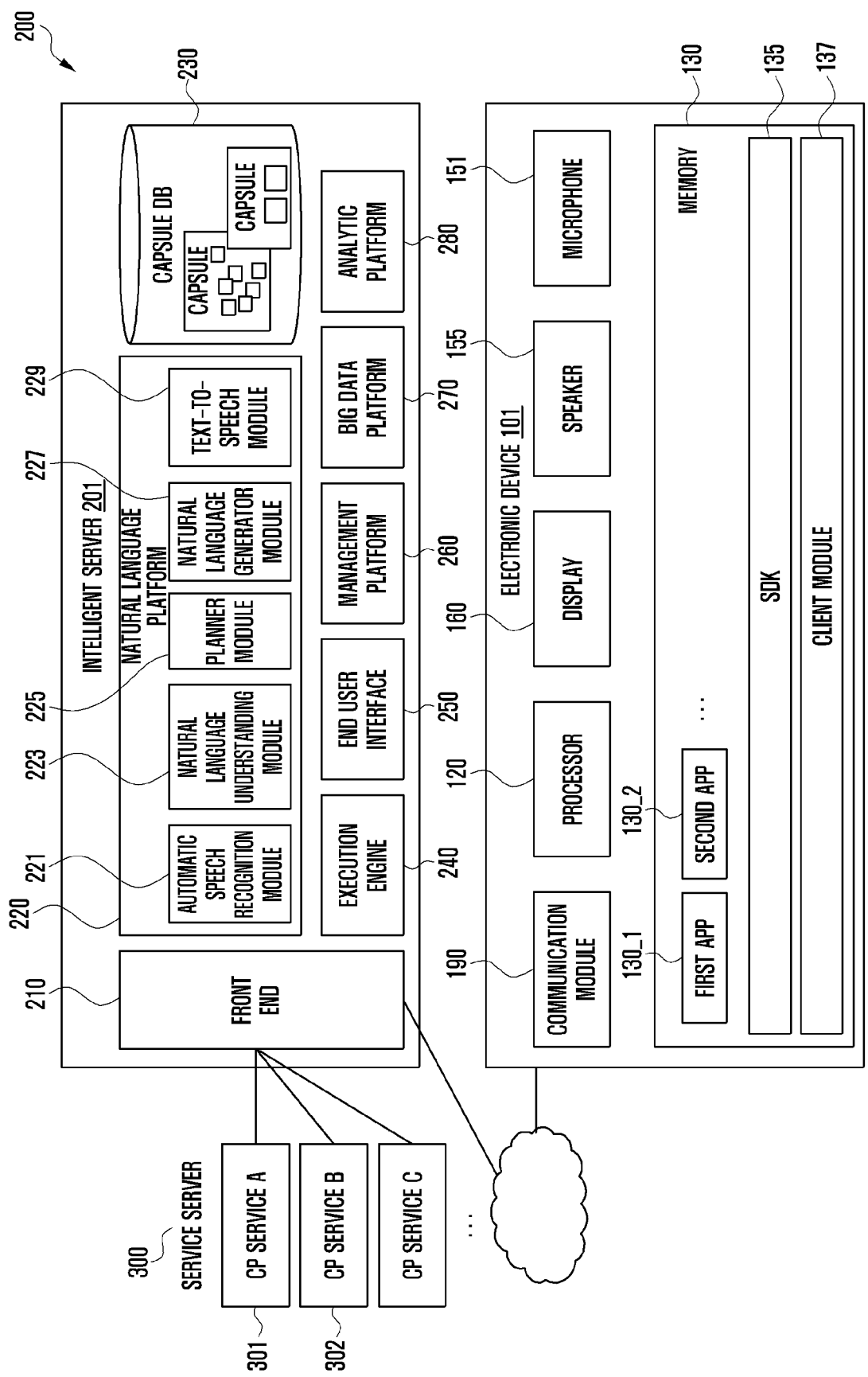
FIG. 2 illustrates a block diagram of an integrated intelligence system according to various embodiments.

FIG. 2 illustrates a block diagram of an integrated intelligence system according to various embodiments.

Referring to FIG. 2, the integrated intelligence system 200 according to an embodiment may include an electronic device 101, an intelligent server 201, and a service server 300.

The electronic device 101 according to an embodiment may be a terminal device (or an electronic device) connectable to the Internet, such as mobile phones, smart phones, personal digital assistants (PDAs), notebook computers, TV sets, home appliances, wearable devices, HMDs, or smart speakers.

According to the illustrated embodiment, the electronic device 101 may include a communication module 190, a microphone 151, a speaker 155, a display 160, a memory 130, or a processor 120. The elements listed above may be operatively or electrically connected to each other.

The communication module 190 in an embodiment may be configured to transmit and receive data while being connected to an external device. In certain embodiments, the microphone 151 receives sound (e.g., a user utterance) and, may convert the same into an electrical signal. The speaker 155 in an embodiment may outputs an electrical signal in the form of sound (e.g., voice). The display 160 in an embodiment may be configured to display images or videos. The display 160 in an embodiment may display graphic user interfaces (GUIs) of executed applications (or application programs).

The memory 130 in an embodiment may store a client module 137, a software development kit (SDK) 135, and a plurality of apps 133. The client module 137 and the SDK 135 may configure a framework (or a solution program) for performing general functions. In addition, the client module 137 or the SDK 135 may configure a framework for processing a voice input.

In the memory 130 of an embodiment, the plurality of apps 133 may be programs for performing specified functions. According to an embodiment, the plurality of apps 133 may include a first app 130_1 and a second app 130_2. According to an embodiment, each of the plurality of apps 133 may include a plurality of operations for performing a specified function. For example, the apps may include an alarm app, a message app, and/or a schedule app. According to an embodiment, a plurality of apps 133 may be executed by the processor 120, thereby sequentially executing at least some of the plurality of operations.

The processor 120 in an embodiment may control the overall operation of the electronic device 101. For example, the processor 120 may be electrically connected to the communication module 190, the microphone 151, the speaker 155, and the display 160, and may perform specified operations.

The processor 120 in an embodiment may also execute a program stored in the memory 130 to perform a specified function. For example, the processor 120 may execute at least one of the client module 137 or the SDK 135, thereby performing the following operation for processing a voice input. The processor 120, for example, may control the operation of the plurality of apps 155 through the SDK 135. The following operation described as the operation of the client module 137 or the SDK 135 may be the operation executed by the processor 120.

The client module 137 in an embodiment may receive a voice input. For example, the client module 137 may receive a voice signal corresponding to a user utterance detected through the microphone 151. The client module 137 may transmit the received voice input to the intelligent server 201. The client module 137 may transmit state information of the electronic device 101 to the intelligent server 201 along with the received voice input. The state information, for example, may be information on the execution state of the app.

The client module 137 in an embodiment may receive a result corresponding to the received voice input. For example, if the intelligent server 201 is able to produce a result corresponding to the received voice input, the client module 137 may receive the result corresponding to the received voice input. The client module 137 may display the received result on the display 160.

The client module 137 in an embodiment may receive a plan corresponding to the received voice input. The client module 137 may display execution results of a plurality of operations of the app according to the plan on the display 160. The client module 137, for example, may sequentially display the execution results of a plurality of operations on the display. As another example, the electronic device 101 may display only some of the execution results of the plurality of operations (e.g., the result of the last operation) on the display.

According to an embodiment, the client module 137 may receive, from the intelligent server 201, a request for obtaining information required to produce the result corresponding to the voice input. According to an embodiment, the client module 137 may transmit the required information to the intelligent server 201 in response to the request.

The client module 137 in an embodiment may transmit information on the results of executing a plurality of operations according to the plan to the intelligent server 201. The intelligent server 201 may identify that the received voice input has been correctly processed through the result information.

The client module 137 in an embodiment may include a speech recognition module. According to an embodiment, the client module 137 may recognize a voice input performing a limited function through the speech recognition module. For example, the client module 137 may perform an intelligent app for processing a voice input for executing collaborative operations through a specified input (e.g., "Wake up!").

The intelligent server 201 in an embodiment may receive information related to a user voice input from the electronic device 101 through a communication network. According to an embodiment, the intelligent server 201 may convert data related to the received voice input into text data. According to an embodiment, the intelligent server 201 may produce a plan for performing a task corresponding to the user voice input, based on the text data.

According to an embodiment, the plan may be produced by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above systems, or may be another artificial intelligent system. According to an embodiment, the plan may be selected from a set of predefined plans, or may be produced in real time in response to a request by the user. For example, the artificial intelligent system may select at least one plan from among a plurality of predefined plans.

The intelligent server 201 in an embodiment may transmit a result according to the produced plan to the electronic device 101, or may transmit the produced plan to the electronic device 101. According to an embodiment, the electronic device 101 may display the result according to the plan on the display. According to an embodiment, the electronic device 101 may display the result of executing the operation according to the plan on the display.

The intelligent server 201 in an embodiment may include a front end 210, a natural language platform 220, a capsule database (DB) 230, an execution engine 240, an end user interface 250, a management platform 260, a big data platform 270, or an analytic platform 280.

The front end 210 in an embodiment may receive a voice input from the electronic device 101. The front end 210 may transmit a response to the voice input.

According to an embodiment, the natural language platform 220 may include an automatic speech recognition module (ASR module) 221, a natural language understanding module (NLU module) 223, a planner module 225, a natural language generator module (NLG module) 227, or a text-to-speech module (TTS module) 229.

The automatic speech recognition module 221 in an embodiment may convert a voice input received from the electronic device 101 into text data. The natural language understanding module 223 in an embodiment may recognize the intention of the user using the text data of the voice input. For example, the natural language understanding module 223 may perform a syntactic analysis or a semantic analysis, thereby recognizing the intention of the user. The natural language understanding module 223 in an embodiment may recognize the meaning of a word extracted from the voice input using the linguistic features (e.g., syntactic elements) of morphemes or phrases, and may match the recognized meaning of the word with the intention, thereby determining the intention of the user.

The planner module 225 in an embodiment may produces a plan using the intention determined in the natural language understanding module 223 and parameters. According to an embodiment, the planner module 225 may determine a plurality of domains used to perform the task, based on the determined intention. The planner module 225 may determine a plurality of operations included in each of a plurality of domains determined based on the intention. According to an embodiment, the planner module 225 may determine parameters used to execute the plurality of determined operations or result values output by executing the plurality of operations. The parameter and the result values may be defined as concepts of a designated format (or class). Accordingly, the plan may include a plurality of operations determined based on the intention of the user, and a plurality of concepts.

The planner module 225 may determine the relationship between the plurality of operations and the plurality of concepts by stages (or hierarchically). For example, the planner module 225 may determine the order of executing a plurality of operations determined based on the intention of the user on the basis of the plurality of concepts. In other words, the planner module 225 may determine the order of executing a plurality of operations based on the parameters that are used for the execution of the plurality of operations and the results output by execution of the plurality of operations. Accordingly, the planner module 225 may produce a plan including relationship information (e.g., ontology) between a plurality of operations and a plurality of concepts. The planner module 225 may produce a plan using information stored in the capsule DB 230 that stores a set of relationships between concepts and operations.

The natural language generator module 227 in an embodiment may convert specified information into text. The information converted into the text may be in the form of a natural language speech. The text-to-speech module 229 in an embodiment may convert information in the form of text into information in the form of a voice.

According to an embodiment, some or all of the functions of the natural language platform 220 may be implemented in the electronic device 101 as well.

The capsule DB 230 may store information on the relationship between a plurality of concepts and actions corresponding to a plurality of domains. The capsule according to an embodiment may include a plurality of action objects (or action information) and concept objects (concept information) included in the plan. According to an embodiment, the capsule DB 230 may store a plurality of capsules in the form of a concept action network (CAN). According to an embodiment, a plurality of capsules may be stored in a function registry included in the capsule DB 230.

The capsule DB 230 may include a strategy registry that stores strategy information necessary for determining the plan corresponding to the voice input. If there is a plurality of plans corresponding to the voice input, the strategy information may include reference information for determining one plan. According to an embodiment, the capsule DB 230 may include a follow-up registry that stores information on a subsequent operation in order to propose the subsequent operation to the user in a specified situation. The subsequent operation may include, for example, a subsequent speech. According to an embodiment, the capsule DB 230 may include a layout registry that stores information on the layout of information output through the electronic device 101.

According to an embodiment, the capsule DB 230 may include a vocabulary registry that stores vocabulary information included in the capsule information. According to an embodiment, the capsule DB 230 may include a dialog registry that stores information on the dialogs (or interactions) with the user. The capsule DB 230 may update the stored object through a developer tool. The developer tool may include, for example, a function editor for updating the action object or the concept object. The developer tool may include a vocabulary editor for updating vocabulary.

The developer tool may include a strategy editor for producing and registering the strategy for determining the plan. The developer tool may include a dialog editor for producing a dialog with the user. The developer tool may include a follow-up editor capable of activating a subsequent goal and editing a subsequent speech that provide hints. The subsequent goal may be determined based on the currently set goal, user preference, or environmental conditions. In an embodiment, the capsule DB 230 may also be implemented in the electronic device 101.

The execution engine 240 in an embodiment may produce a result using the produced plan. The end user interface 250 may transmit the produced result to the electronic device 101. Accordingly, the electronic device 101 may receive the result, and may provide the received result to the user. The management platform 260 in an embodiment may manage information used in the intelligent server 201. The big data platform 270 in an embodiment may collect user data. The analytic platform 280 in an embodiment may manage the quality of service (QoS) of the intelligent server 201. For example, the analytic platform 280 may manage the components and the processing speed (or efficiency) of the intelligent server 201.

The service server 300 in an embodiment may provide a specified service (e.g., order food or reserve hotel) to the electronic device 101. According to an embodiment, the service server 300 may be a server operated by a third party. The service server 300 in an embodiment may provide the intelligent server 201 with information for producing the plan corresponding to the received voice input. The provided information may be stored in the capsule DB 230. In addition, the service server 300 may provide information on a result according to the plan to the intelligent server 201.

In the integrated intelligent system 10 described above, the electronic device 101 may provide various intelligent services to the user in response to a user input. The user input, for example, may include an input through a physical button, a touch input, or a voice input.

In an embodiment, the electronic device 101 may provide speech recognition services through an intelligent app (or a speech recognition app) stored therein. In this case, for example, the electronic device 101 may recognize a user utterance or a voice input received through the microphone, and may provide a service corresponding to the recognized voice input to the user.

In an embodiment, the electronic device 101 may perform a specified operation alone or together with the intelligent server 201 and/or the service server, based on the received voice input. For example, the electronic device 101 may execute an app corresponding to the received voice input, and may perform a specified operation through the executed app.

In an embodiment, in the case in which the electronic device 101 provides a service together with the intelligent server 201 and/or the service server, the electronic device 101 may detect a user utterance using the microphone 151, and may generate a signal (or voice data) corresponding to the detected user utterance. The electronic device 101 may transmit the voice data to the intelligent server 201 using the communication module 190.

In response to the voice input received from the electronic device 101, the intelligent server 201 according to an embodiment may produce a plan for performing the task corresponding to the voice input, or results of performing the operation according to the plan. The plan may include, for example, a plurality of operations for performing the task corresponding to a user voice input and a plurality of concepts related to the plurality of operations. The concepts may be defined as parameters that are input for execution of the plurality of operations or result values that are output by execution of the plurality of operations. The plan may include information on the relationship between the plurality of operations and the plurality of concepts.

The electronic device 101 according to an embodiment may receive the response using the communication module 190. The electronic device 101 may output a voice signal generated inside the electronic device 101 to the outside using the speaker 155, or may output an image produced inside the electronic device 101 to the outside using the display 160.

Figure 3:
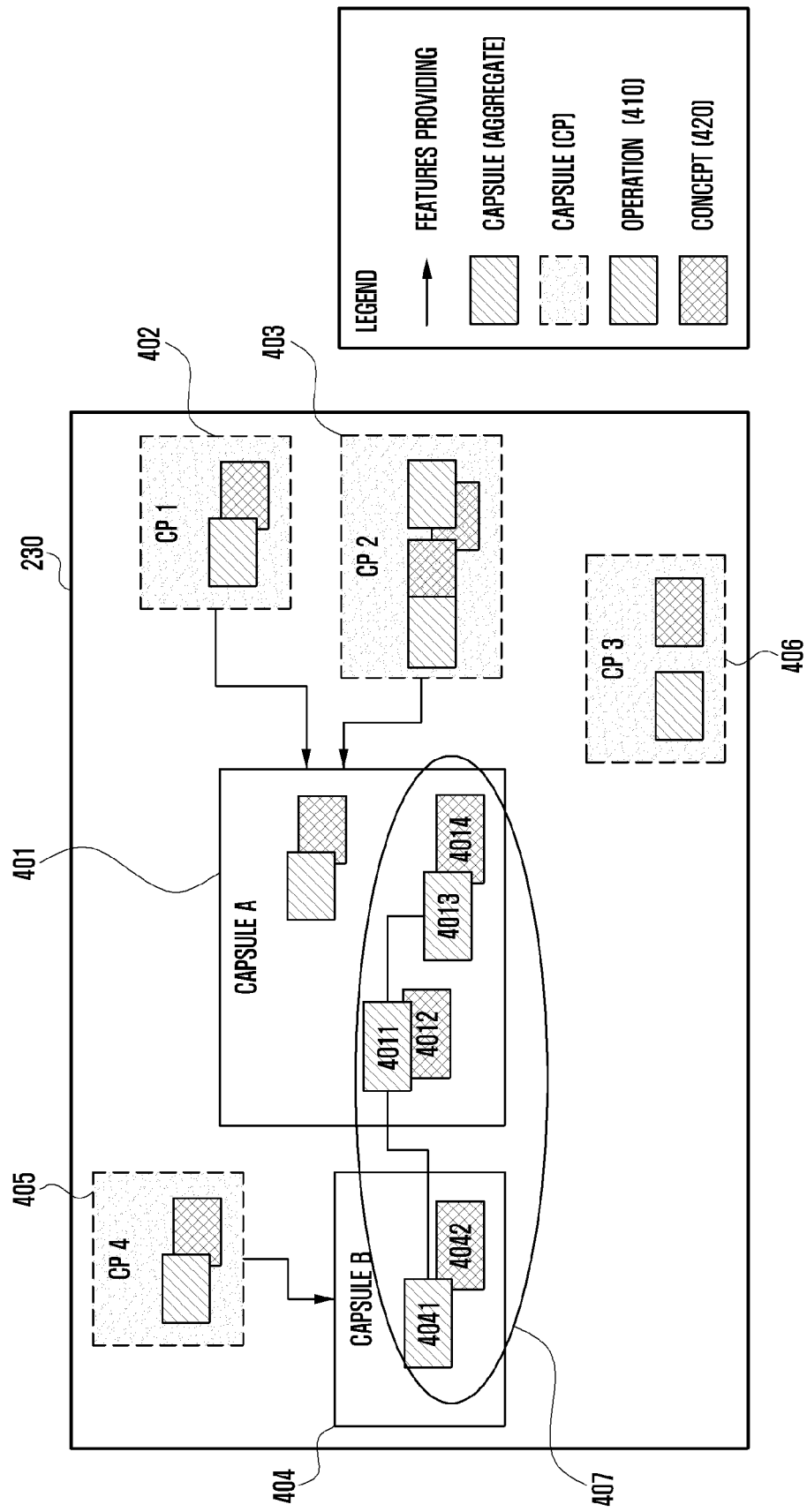
FIG. 3 illustrates a diagram depicting a the relationship between concepts and actions are stored in a database according to various embodiments.

FIG. 3 illustrates a diagram depicting the relationship between concepts and operations is stored in a database according to various embodiments.

Referring to FIG. 3, a capsule DB (e.g., the capsule DB 230) of the intelligent server 201 may store capsules in the form of a concept action network (CAN). The capsule DB 230 may store operations for processing the tasks corresponding to the user voice inputs and parameters that are used for the operations in the form of a concept action network (CAN).

The capsule DB 230 may store a plurality of capsules (capsule A 401 and capsule B 404) corresponding to respective domains (e.g., applications). According to an embodiment, one capsule (e.g., capsule A 401) may correspond to one domain (e.g., a location (geo) or an application). In addition, one capsule may correspond to at least one service provider (e.g., CP 1 402 or CP 2 403) for performing a function for the domain related to the capsule. According to an embodiment, one capsule may include one or more operations 410 and one or more concepts 420 in order to perform a specified function.

The natural language platform 220 may produce a plan for performing a task corresponding to the received voice input using the capsules stored in the capsule DB. For example, the planner module 225 of the natural language platform may produce a plan using the capsules stored in the capsule DB. For example, a plan 407 may be produced using operations 4011 and 4013 and concepts 4012 and 4014 of capsule A 401, and an operation 4041 and a concept 4042 of capsule B 404.

Figure 4:
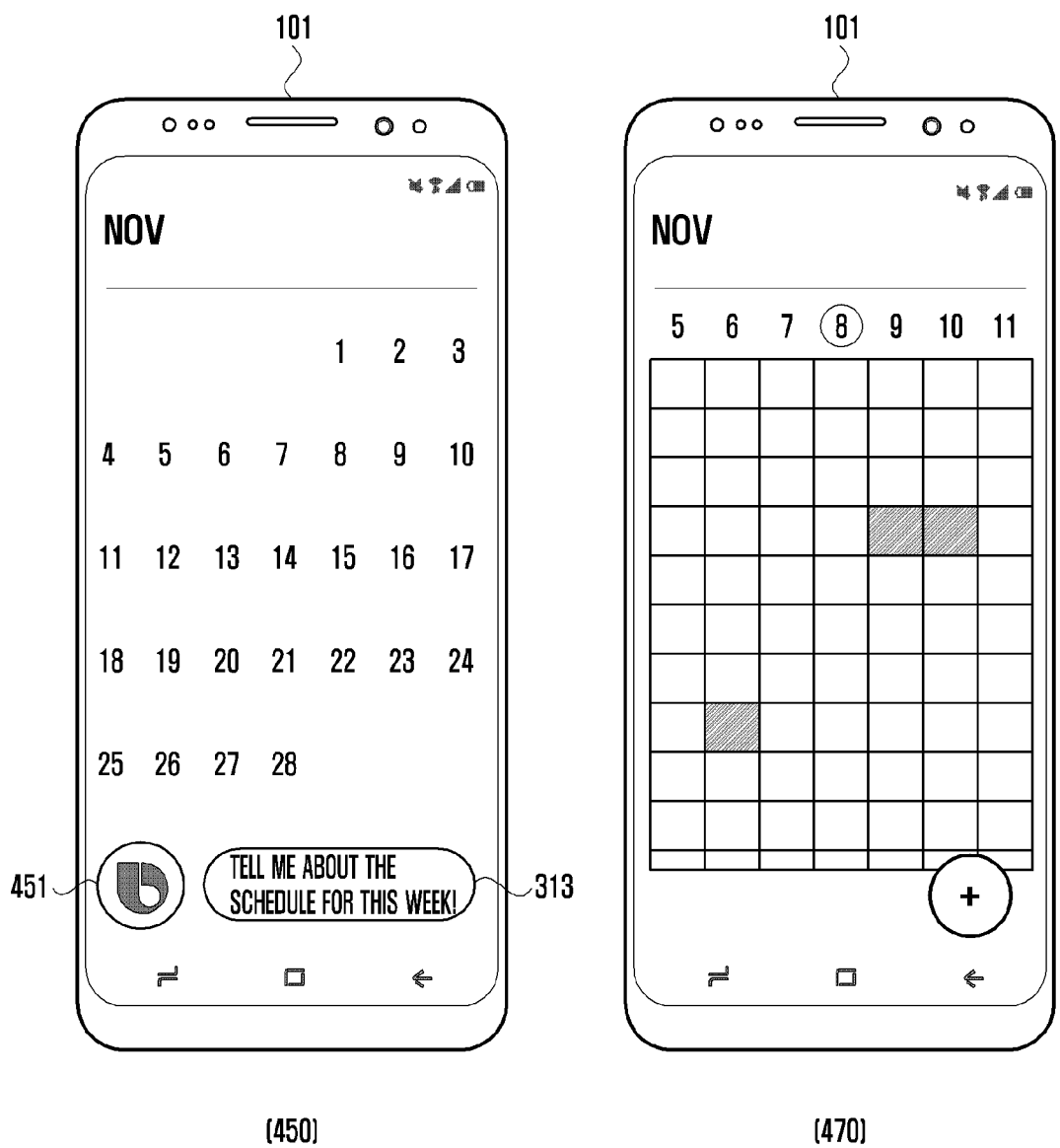
FIG. 4 illustrates a diagram of an example user interface for processing a voice input received through an intelligent application of an electronic device according to various embodiments.

FIG. 4 illustrates a diagram of an example user interface, such as a screen, for processing a voice input received through an intelligent application by an electronic device according to various embodiments.

Referring to FIG. 4, the electronic device 101 may execute an intelligent application in order to process a user input through the intelligent server 201.

According to an embodiment, in a first user interface 450, when the electronic device 101 recognizes a specified voice input (e.g., "Wake up") or receives an input through a hardware key (e.g., a dedicated hardware key), the electronic device 101 may execute an intelligent app for processing the voice input. The electronic device 101 may execute the intelligent application (or app) while, for example, a schedule application (or app) is running. According to an embodiment, the electronic device 101 may display an object (e.g., an icon) 451 corresponding to the intelligent app on the display 160. According to an embodiment, the electronic device 101 may receive a voice input by utterance of the user. For example, the electronic device 101 may receive a voice input saying "Tell me about the schedule for this week!". According to an embodiment, the electronic device 101 may display, on the display, a user interface (UI) 313 (e.g., an input window) of the intelligent app in which text data of the received voice input is shown.

According to an embodiment, in a second user interface 470, the electronic device 101 may display a result corresponding to the received voice input on the display. For example, the electronic device 101 may receive a plan corresponding to the received user input, and may display "this week's schedule" on the display according to the plan.

Figure 5:
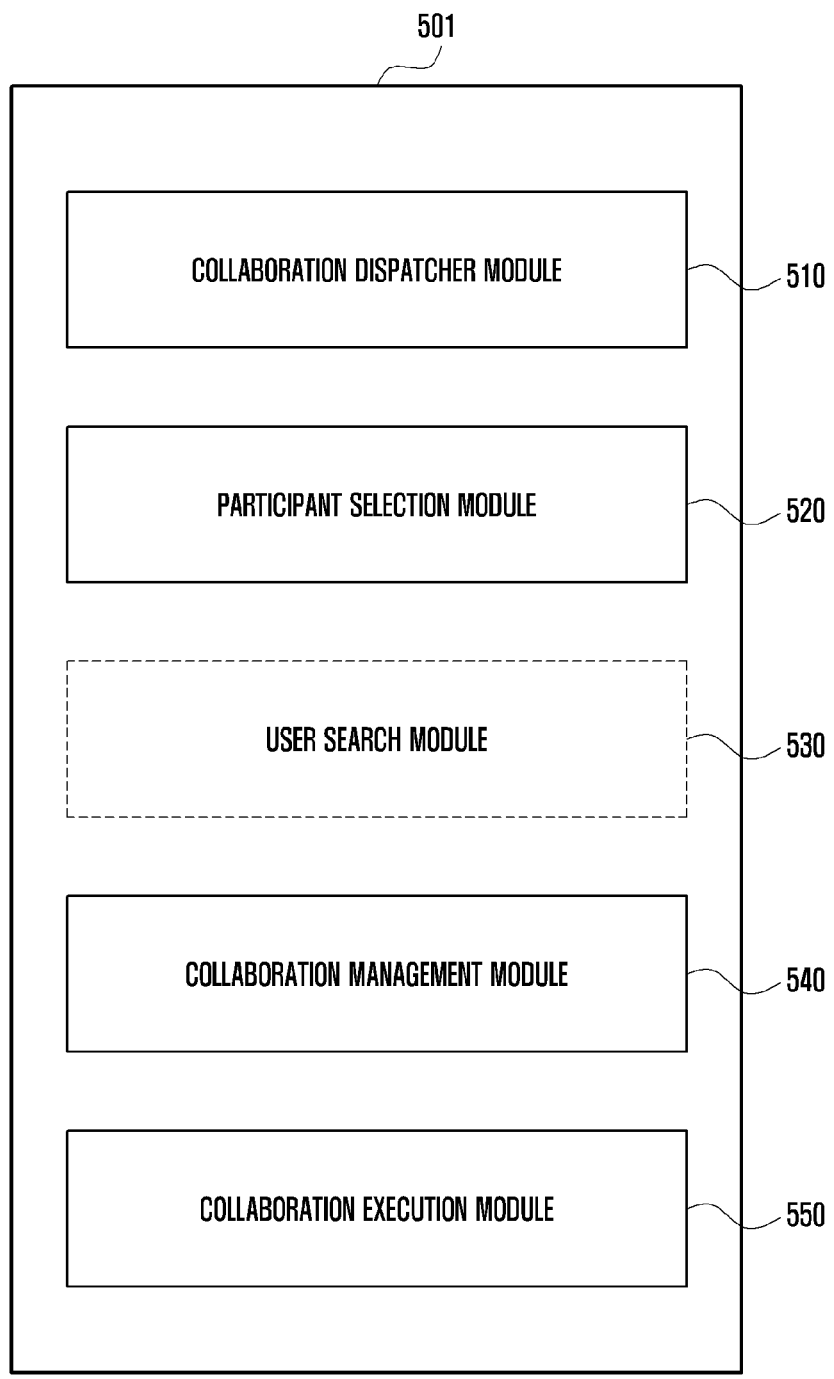
FIG. 5 illustrates a diagram of an example collaboration module of an electronic device according to various embodiments.

FIG. 5 illustrates a diagram of an example collaboration module of an electronic device according to various embodiments.

Referring to FIG. 5, an electronic device (e.g., the electronic device 101 in FIG. 1) according to various embodiments may include a collaboration module 501 for providing a collaboration function. The collaboration module 501 may be included in the processor of the intelligent server 201 or in the processor 120 of the electronic device 101. Although the collaboration module 501 will be described as operating in the electronic device 101 below, the disclosure is not limited thereto. The processor 120 may execute software to control at least one of other elements (e.g., hardware or software elements) of the electronic device 101, and may perform various data processing or operations. In addition to the modules shown in FIG. 2, the intelligent server 201 may further include the collaboration module 501 in order to provide a collaboration function in response to a voice command. Alternatively, the electronic device 101 may further include the collaboration module 501 in order to provide a collaboration function in response to a voice command in addition to the modules shown in FIG. 1. The collaboration module 501 may include at least one of a collaboration dispatcher module 510, a participant selection module 520, a user search module 530, a collaboration management module 540, or a collaboration execution module 550.

The collaboration dispatcher module 510 may determine (or identify) whether to perform a collaborative task. The collaboration dispatcher module 510 may determine whether to perform a collaborative task by analyzing the user utterance (or text data related to the user utterance). The user utterance may be input through a microphone (e.g., the input device 150 in FIG. 1) of the electronic device 101. The electronic device 101 may interwork with the intelligent server 201 to analyze the user utterance or determine whether to perform a collaborative task. For example, the electronic device 101 may transmit the input user utterance to the intelligent server 201. An automatic speech recognition module (e.g., the automatic speech recognition module 221 in FIG. 2) of the intelligent server 201 may convert the received user utterance into text data. The electronic device 101 may receive the converted text data from the intelligent server 201, or may receive information on whether the data matches a collaboration pattern.

For example, the collaboration dispatcher module 510 may determine whether the converted text data matches a collaboration pattern (or collaboration intention). The collaboration pattern may be previously stored in a capsule DB (e.g., the capsule DB 230 in FIG. 2) of the intelligent server 201 or a memory (e.g., the memory 130 in FIG. 1) of the electronic device 101. For example, the collaboration pattern may be an utterance containing names (e.g., the name of a third party) such as "Confirm with [name]" and "I like to have a cup of coffee with [name]". The collaboration dispatcher module 510 may determine whether the user utterance matches the collaboration pattern one-to-one (e.g., rule matching) or matches partially the same (e.g., matching of 50% or more).

According to various embodiments, the collaboration dispatcher module 510 may determine whether the user utterance corresponds to an action intended for collaboration (e.g., ordering a drink, booking accommodation, etc.). The collaboration dispatcher module 510 may perform natural language understanding on the converted text data using a natural language understanding module (e.g., natural language understanding module 223 in FIG. 2) of the intelligent server 201. The natural language understanding module 223 may recognize the intention of the user using the converted text data. The collaboration dispatcher module 510 may determine whether the identified user intention corresponds to an action intended for collaboration. The collaboration dispatcher module 510 may determine whether the identified user intention corresponds to an action intended for collaboration using a collaboration model. The collaboration model may indicate a model machine-learned by utterances intended for collaboration. The collaboration dispatcher module 510 may utilize a natural language understanding (NLU) model as the collaboration model.

According to various embodiments, when the user speaks, the collaboration dispatcher module 510 may determine whether to perform a collaborative task, based on whether a user input for a collaborative task is received. The user input may include selection of a specific button (e.g., a physical button or a software button) of the electronic device 101 or a specific wake-up utterance. The user input for a collaborative task may be pre-stored in the capsule DB 230 or the memory 130. When receiving a user utterance from the electronic device 101, if the user input received together therewith corresponds to a user input stored in the capsule DB 230, the collaboration dispatcher module 510 may determine to perform a collaborative task. According to various embodiments, the collaboration dispatcher module 510 may determine whether to perform a collaborative task, based on whether a user input for a collaborative task is further received. If the user input further received after receiving the user utterance corresponds to the user input stored in the memory 130 or the capsule DB 230, the collaboration dispatcher module 510 may determine to perform a collaborative task.

According to various embodiments, the collaboration dispatcher module 510 may transmit information on whether to perform a collaborative task to the participant selection module 520. If a collaborative task is determined, the collaboration dispatcher module 510 may inform the participant selection module 520 of the collaborative task. The collaboration dispatcher module 510 may analyze a participant in the collaborative task, and may transmit information on whether there is one participant or one or more participants to the participant selection module 520. The collaboration dispatcher module 510 may transmit information on whether to perform the collaborative task or participant information (e.g., names) to the participant selection module 520. Alternatively, if the participant fails to be analyzed, the collaboration dispatcher module 510 may transmit only the information on whether to perform the collaborative task to the participant selection module 520.

The participant selection module 520 may receive a user input for selecting a participant in the collaborative task from the user. To this end, the participant selection module 520 may provide a user interface or a voice for selecting a participant in the collaborative task. For example, the participant selection module 520 may receive information on whether to perform the collaborative task or participant information from the collaboration dispatcher module 510. If the collaborative task is determined by the collaboration dispatcher module 510, the participant selection module 520 may instruct (or request) the electronic device 101 of the user to provide a user interface or a voice for selecting the participant.

For example, if the collaboration dispatcher module 510 analyzes (or recognizes or identifies) that there is one participant, the participant selection module 520 may indicate the electronic device 101 to provide contact information corresponding to the analyzed participant. The contact information may include a phone number or user information registered in a messenger (or message) application. Alternatively, if it is analyzed that there are more than one participant, the participant selection module 520 may instruct the electronic device 101 to provide a participant list corresponding to a plurality of analyzed participants. The participant selection module 520 may request at least one piece of participant information (e.g., a phone number) selected from the electronic device 101.

According to various embodiments, in the case where the participant selection module 520 receives only the information on whether to perform the collaborative task from the collaboration dispatcher module 510 without participant information, the participant selection module 520 may inquire about the participant to the user. The participant selection module 520 may provide contact information stored in the electronic device 101 or user information registered in a messenger application in order to select a participant. When selection of the participant is completed by the user, the participant selection module 520 may transmit information on the selected participant (e.g., a phone number and a device identifier) to the user search module 530.

The user search module 530 may identify whether an electronic device (e.g., the electronic device 102 or the electronic device 104 in FIG. 1) of at least one participant provides a voice agent function, based on the participant information. In FIG. 5, although the user search module 530 is described as being included in the intelligent server 201, the user search module 530 may be included in a separate server (e.g., the server 108 in FIG. 1 or a personal information server). In the case where the user search module 530 is included in the personal information server, the collaboration management module 540 may interwork with the personal information server, thereby identifying whether the electronic device of at least one participant provides a voice agent function. The user search module 530 may receive participant information from the participant selection module 520, and, based on the participant information, may identify whether the electronic device (e.g., the electronic device 102 or the electronic device 104 in FIG. 1) of the participant provides a voice agent function. The user search module 530 may store information (e.g., a phone number and a device identifier) of an electronic device that provides a voice agent function in a personal information database (or the capsule DB 230).

If a participant corresponding to the participant information is retrieved from the personal information database, the user search module 530 may determine that the electronic device of the participant provides a voice agent function. If a participant corresponding to the participant information is not retrieved from the personal information database, the user search module 530 may determine that the electronic device of the participant does not provide a voice agent function. The user search module 530 may transmit information on whether the participant provides a voice agent function to the collaboration management module 540.

The collaboration management module 540 may collect information related to the collaborative task through interaction between the user and at least one participant. The information related to the collaborative task may include at least one of domains, actions, or parameters. The domains may indicate applications (e.g., a beverage order application, a hotel reservation application, and an airline reservation application) installed in the electronic device 101 (or the electronic device 102). The actions may indicate specific functions to be performed (e.g., order a drink at the location XX) in the application. The parameters may be information (e.g., names, types (e.g., hot/ice), and sizes of beverages and the like) that is used to perform specific functions in the applications. The domains or the actions may be configured, added, changed, or deleted by the user or at least one participant. The parameters may be received from the user or the participant, respectively, and the parameters of the user and the participant may be the same or different.

According to various embodiments, the collaboration management module 540 may determine the method of collecting information for collection of information, based on whether the electronic device of the participant provides a voice agent function. For example, if the user search module 530 determines that the participant provides a voice agent function, the collaboration management module 540 may collect information for the collaborative task using the voice agent function in the electronic device of the participant. The information collection method using the voice agent function may be providing a user interface for collecting information, or may be providing a voice for collecting information (e.g., an utterance by text-to-speech) to the electronic device of the participant.

The user interface may include at least one of text, images, and videos. Alternatively, if the user search module 530 determines that the participant does not provide a voice agent function, the collaboration management module 540 may perform control to send a message (or messenger) including link information for providing a voice agent function to the electronic device of the participant. If the link information is selected by the participant, the collaboration management module 540 provides a web page that provides a voice agent function, thereby collecting information through the web page. The web page may provide a user interface or a voice (e.g., a TTS utterance) for collecting information.

According to various embodiments, the collaboration management module 540 may manage information obtained from dialogs with at least one participant. The obtained information may include at least one of dialog text, information on the NLU analysis result of dialogs (e.g., domains, actions, parameters, etc.), or a form obtained by accumulating dialogs and converting the same to a specific value (e.g., a vector expressed as integer values). The collaboration management module 540 may accumulate utterances obtained from the participants at or after the time at which the user of the electronic device 101 speaks, and may interpret the meanings of the utterances by a natural language understanding module (e.g., the natural language understanding module 223 in FIG. 2). The collaboration management module 540 may produce text by a natural language generator module (e.g., the natural language generator module 227 in FIG. 2) for the interpreted meanings of the utterances, and may provide the produced text to the electronic device (e.g., the electronic device 101, the electronic device 102, or the electronic device 104) of the user or at least one participant. Alternatively, the text-to-speech module 229 may speech-convert the text produced by the natural language generator module 227, and may provide the same to the electronic device of the user or at least one participant.

According to various embodiments, the collaboration management module 540 may produce (or manage) a collaborative task, based on the collected information. The collaborative task production method may include at least one of a method in which the participant corrects a collaborative task, based on a user utterance (e.g., an initial command) of the electronic device 101, a method in which the user and the participant enter a collaborative task, respectively, or a method in which the user and the participant interact to configure a collaborative task. The collaboration management module 540 may provide information collected in relation to the collaborative task to the user or the participant through a user interface or a voice. The collaboration management module 540 may transmit, to the user or the participant, inquiries (e.g., additional questions) to collect information related to the collaborative task, and may receive a first response (e.g., "I am not sure, ask [user]") or a second response (e.g., a different response from the user) from the participant.

The first method (e.g., the participant correction method) may include operations of collecting information related to the collaborative task (e.g., domains, actions, and parameters), based on the user utterance, providing the collected information to the participant, and correcting the information related to the collaborative task, based on a participant input. For example, the collaboration management module 540 may collect domains (e.g., a coffee order application), actions (e.g., order coffee at Star Valley (e.g., the order place)), and parameters (e.g., Americano), based on the utterance of a user (e.g., Sujan) "Order an Americano from Star Valley with Mark". The collaboration management module 540 may collect all of domains, actions, and parameters for the collaborative task from the user utterance. The collaboration management module 540 may provide the participant (e.g., Mark) with information related to the collaborative task, such as "Sujan ordered an Americano from Star Valley", and may receive, from the participant (e.g., Mark), a voice command (or a touch input) such as "Okay, order an ice latte for me." The collaboration management module 540 may correct the information related to the collaborative task (e.g., the domain (e.g., the coffee order application), the action (e.g., order coffee from Star Valley (e.g., the order place)), and the parameters (e.g., Americano and ice latte)). When production of the collaborative task is completed through the correction, the collaboration management module 540 may transmit the produced collaborative task to the collaboration execution module 550.

The second method (e.g., the participant input method) may include operations of collecting first information related to the collaborative task (e.g., collaborative task information of the user), based on the user utterance, collecting second information related to the collaborative task (e.g., collaborative task information of the participant) from the participant, and producing the first information and the second information through the collaborative task. For example, the collaboration management module 540 may collect domains (e.g., a coffee order application), actions (e.g., order coffee at Star Valley (e.g., the order place)), and parameters (e.g., Americano), based on the utterance of a user (e.g., Sujan) "Order an Americano from Star Valley", "Ask Mark too". The collaboration management module 540 may provide the participant (e.g., Mark) with a user interface or a voice such as "Please order drinks you will enjoy with Sujan at Star Valley", and may receive a voice command (or a touch input) saying "Order a latte from OO Mall for me" from the participant (e.g., Mark). The collaboration management module 540 may input the first information (e.g., Sujan's order for coffee) and the second information (e.g., Mark's order for coffee) as a collaborative task. When the input of the information related to the collaborative task is completed, the collaboration management module 540 may transmit a collaborative task including the first information and the second information to the collaboration execution module 550.

The third method (e.g., the collaborative task configuration method) may be performed such that the user and the participant communicate with each other to thus collect information related to the collaborative task (e.g., domains, actions, and parameters). For example, the collaboration management module 540 may provide the participant (e.g., Mark) with a user interface or a voice such as "Would you like to have a coffee with Sujan", based on the utterance of the user (e.g., Sujan) such as "Ask Mark if he wants coffee". The collaboration management module 540 may receive a voice "A cup of Americano at Star Valley (e.g., the order place)?" from the participant (e.g., Mark), and, based on the received voice, may provide the user (e.g., Sujan) with a user interface or a voice saying "Mark has ordered an Americano from Star Valley."

The collaboration management module 540 may receive a voice saying "Okay, me too" from the user (e.g., Sujan), and may configure (or input) the information related to the collaborative task (e.g., domains (e.g., the coffee order application), actions (e.g., order coffee from Star Valley (e.g., the order place)), and parameters (e.g., two cups of Americano)). In the third method, when the dialog is over, the collaboration management module 540 may provide the information related to the collaborative task to a representative (e.g., the user or the participant) before ordering. When the production of the collaborative task is completed, the collaboration management module 540 may transmit the produced collaborative task to the collaboration execution module 550.

According to various embodiments, the collaboration management module 540 may analyze the collaborative task, and may differently determine the processing method thereof depending on whether any one piece of information in the collaborative task corresponds to a single or multiple choices. If there is a difference in choices for the information requiring a single choice (e.g., the action (e.g., the order place)) between the participants, the collaboration management module 540 may repeatedly provide additional questions until the choices of participants match each other. If the additional questions are repeated a predetermined number of times or more, the collaboration management module 540 may make a decision by a majority vote between the user and the participant, or may appoint a representative participant through a dialog between the participants so that the appointed representative makes a decision. The collaboration management module 540 may accumulate choices of the participants for the information requiring multiple choices (e.g., the parameters (e.g., order menu items)). The collaboration management module 540 may allow the respective participants to add, remove, and modify the parameters.

According to various embodiments, the collaboration management module 540 may provide information collected in relation to the collaborative task to the user or at least one participant. The collected information may include at least one piece of current command information (e.g., order coffee), request information (e.g., choice of a coffee item), or dialog history information. The collaboration management module 540 may provide the collected information by at least one method of providing template phrases for cases, providing a common template phrase, or displaying a table. The method of providing template phrases for cases may be displaying the collected information using template sentences predefined by service developers. The template phrases may be produced identically or differently for cases (e.g., order coffee or reserve a hotel).

For example, in the case of inquiring about beverage menu items (e.g., parameters) to be ordered (or purchased) at the 00 coffee shop (e.g., the order place), the collaboration management module 540 may pre-store a template phrase such as "[User] is about to order coffee at [order place] with [at least one participant]" in a capsule DB (e.g., the capsule DB 230 in FIG. 2). The collaboration management module 540 may produce a template phrase using the information related to the collaborative task such as a user, participants, and order places. The collaboration management module 540 may transmit the produced phrase to the electronic device of at least one participant.

The common template phrase may be expressed as a general sentence, based on the information collected so far. For example, the collaboration management module 540 may produce a template phrase such as "[User] is going to do [action] with [at least one participant]. Information determined so far is [collected information]". The collected information is the information collected so far, and may be, for example, the parameters (e.g., a glass of mango juice).

The method of displaying a table may be displaying information, which is collected so far, in the form of a table. For example, the collaboration management module 540 may analyze the collected information, may classify the same into domains, actions, or parameters to be displayed in the respective rows, and may display requested information to be distinguished from the collected information (e.g., highlighting). The collaboration management module 540 may transmit the information produced as shown in Table 1 below to the electronic device of at least one participant.

TABLE 1

| Items | Values | Proposers |
|---|---|---|
| Requesters | A | A |
| Participants | A, B, and C | A |
| Domains | Beverage order application | A |
| Actions | Order drink | A |
| Order places | Star Valley | A and B |
| Order menu items | Americano | |
| Payment Method | | |

The collaboration management module 540 may provide the produced phrase to the natural language generator module 227. The natural language generator module 227 may produce text corresponding to the produced phrase, and the collaboration management module 540 may provide the produced text to the electronic device (e.g., the electronic device 101, the electronic device 102, or the electronic device 104) of the user or at least one participant. Alternatively, the text-to-speech module 229 may convert the text produced by the natural language generator module 227 into speech, and may provide the same to the electronic device (e.g., the electronic device 101, the electronic device 102, or the electronic device 104).

The collaboration management module 540 may provide dialog history information in response to a request by the user or at least one participant. The collaboration management module 540 may provide a dialog between the user and at least one participant in the form of a chat room or a table. The collaboration management module 540 may provide details of a dialog at a specific time in response to an input from the user or at least one participant. The collaboration management module 540 may change the information in response to a user input for the provided dialog.

The collaboration execution module 550 may execute a collaborative task. The collaboration execution module 550 may execute a collaborative task, based on the collaborative task produced using the information collected by the collaboration management module 540. The collaboration execution module 550 may provide the collected information to the user or at least one participant, and may receive confirmation for execution of the collaborative task from the user or at least one participant. The collaboration execution module 550 may change the representative for execution of the collaborative task in response to an input from the user or at least one participant. For example, the collaboration execution module 550 may configure the user who speaks first as a representative, or may configure the participant other than the user as a representative, based on an input by at least one participant. The collaboration execution module 550 may transmit information for executing the collaborative task to the electronic device of the representative who executes the collaborative task, and may provide an execution result to the participants other than the representative.

An electronic device (e.g., the electronic device 101 in FIG. 1) according to various embodiments may include: a speech recognition module (e.g., the client module 137 in FIG. 2); a memory (e.g., the memory 130 in FIG. 1) configured to store information corresponding to a plurality of domains related to a collaborative task; and a processor (e.g., the processor 120 in FIG. 1) operatively connected to the speech recognition module or the memory, wherein the processor is configured to receive a user voice from a user, analyze the received user voice using the speech recognition module to determine whether to perform a collaborative task, if the collaborative task is determined to be performed, select at least one participant related to the collaborative task, collect information related to the collaborative task from the user or an electronic device (e.g., the electronic device 102 in FIG. 1) of the selected participant, and perform the collaborative task, based on the collected information.

The processor may be configured to convert the user voice into text data, determine whether the converted text data matches a collaborative pattern stored in the memory, and if the converted text data matches the collaborative pattern, determine to perform the collaborative task.

The processor may be configured to convert the user voice into text data, perform natural language understanding on the converted text data, determine whether the intention of the user identified through the natural language understanding corresponds to an action intended for collaboration, and if the intention of the user corresponds to the action intended for collaboration, determine to perform the collaborative task.

The processor may be configured to determine whether to perform the collaborative task, based on whether a user input for the collaborative task is received from the user.

The processor may be configured to select the participant from a contact list stored in the memory, based on the user voice, or select the participant by receiving a user input for selecting the participant from the user.

The processor may be configured to obtain contact information of the selected participant from the memory, based on the contact information of the participant, and identify whether the electronic device of the participant provides a voice agent function.

If the electronic device of the participant does not provide the voice agent function, the processor may be configured to transmit a message including link information for providing the voice agent function to the electronic device of the participant.

The processor may be configured to transmit a user interface or a voice signal for collecting the information related to the collaborative task to the electronic device of the selected participant.

The processor may be configured to obtain the information related to the collaborative task through a voice or a user input from the user or the electronic device of the selected participant.

The processor may be configured to obtain collaborative task information of the user or collaborative task information of the participant from the user.

The processor may be configured to collect the information related to the collaborative task, based on the user voice received from the user, provide the collected information to the electronic device of the participant, and correct the information related to the collaborative task, based on a participant input.

The processor may be configured to collect first information related to the collaborative task, based on the user voice received from the user, collect second information related to the collaborative task from the electronic device of the participant, and produce the collaborative task using the first information and the second information.

The processor may be configured to collect the information related to the collaborative task through interaction between the user and the electronic device of the participant.

The processor may be configured to analyze the collaborative task to identify whether any one piece of information related to the collaborative task corresponds to a single choice or multiple choices, and determine a method of collecting information, based on the identified result.

The processor may be configured to provide the collected information by at least one method of providing template phrases for cases, providing a common template phrase, or displaying a table.

The processor may be configured to provide a result of executing the collaborative task to the user or transmit the result of executing the collaborative task to the electronic device of the participant.

Figure 6:
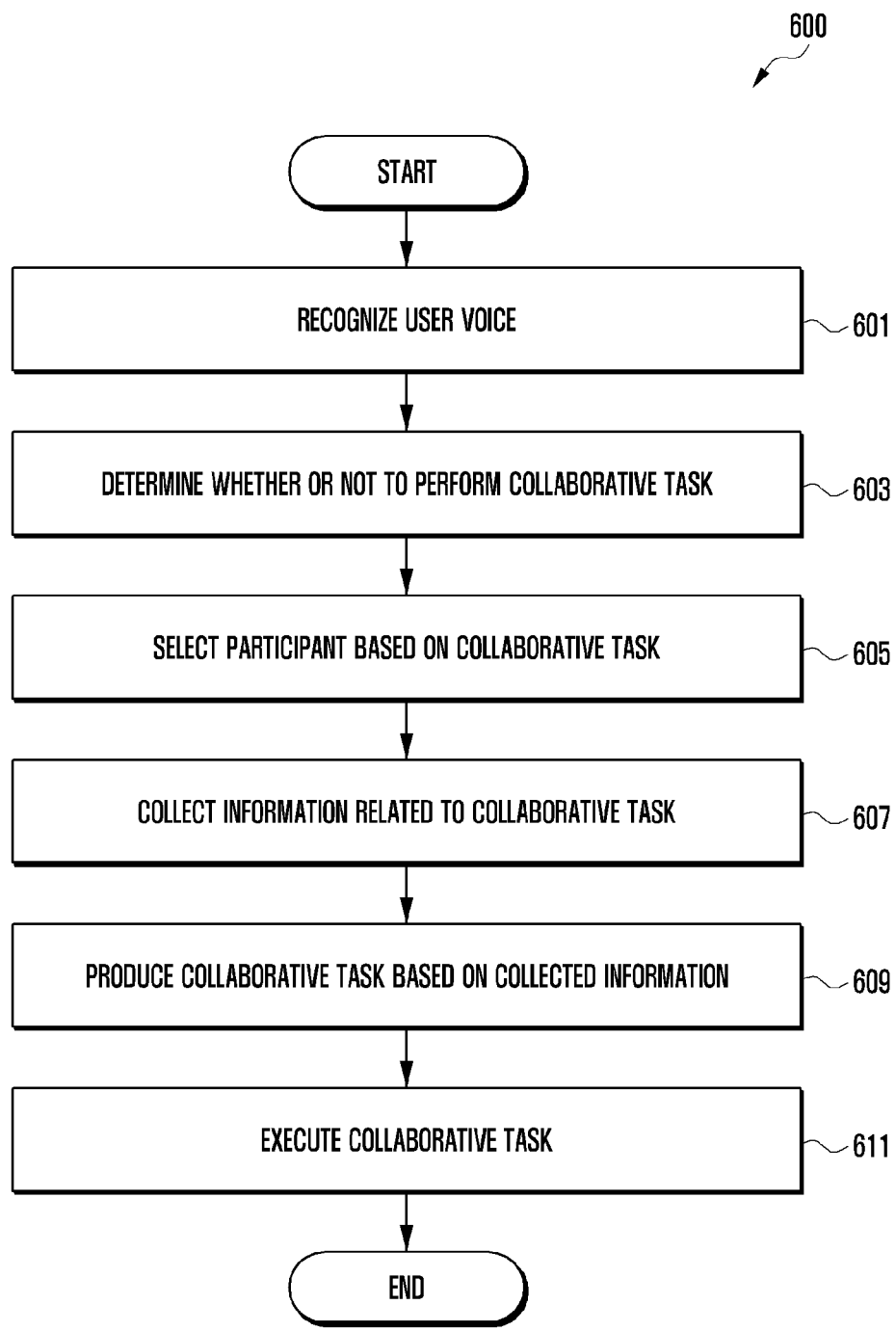
FIG. 6 illustrates a flowchart of a method for operating an electronic device according to various embodiments.

FIG. 6 illustrates a flowchart 600 of a method for operating an electronic device according to various embodiments.

Referring to FIG. 6, in operation 601, a processor (e.g., the processor 120 in FIG. 1) of an electronic device (e.g., the electronic device 101 in FIG. 1) according to various embodiments may recognize a user voice (or a user utterance). The electronic device 101 may receive a user voice input using a client module (e.g., the client module 137 in FIG. 2). For example, the client module 137 may receive a voice signal corresponding to a user utterance sensed through a microphone (e.g., the microphone 151 in FIG. 2). The client module 137 may transmit the received user voice to the intelligent server 201. The automatic speech recognition module (e.g., the automatic speech recognition module 221 in FIG. 2) of the intelligent server 201 may convert the user voice (or the user utterance) received from the electronic device (e.g., the electronic device 101 in FIG. 1) of the user into text data.

In operation 603, the processor 120 (e.g., the collaboration dispatcher module 510 in FIG. 5) may determine whether to perform a collaborative task. The processor 120 may determine whether the converted text data matches a collaboration pattern. The collaboration pattern may be pre-stored in a memory (e.g., the memory 130 in FIG. 1) of the electronic device 101 or a capsule DB (e.g., the capsule DB 230 in FIG. 2) of the intelligent server 201. The processor 120 may determine whether to perform a collaborative task, based on whether the user voice matches the collaboration pattern one-to-one (e.g., rule matching) or partially matches the same (e.g., matching of 50% or more). Alternatively, the processor 120 may determine whether to perform the collaborative task, based on whether the user voice corresponds to an action intended for collaboration (e.g., order a drink, reserve accommodation, or the like).

The processor 120 may perform natural language understanding on the user voice converted into the text data using a natural language understanding module (e.g., the natural language understanding module 223 in FIG. 2) of the intelligent server 201. The processor 120 may determine whether the intention of the user recognized through the natural language understanding corresponds to an action intended for collaboration. Alternatively, the processor 120 may determine whether to perform the collaborative task, based on whether a user input for the collaborative task is received. If a user input further received upon receiving the user voice or after receiving the user voice corresponds to the user input stored in the capsule DB 230, the processor 120 may determine to perform the collaborative task.

According to various embodiments, when the collaborative task is determined to be performed, the processor 120 may inform the participant selection module 520 of the collaborative task. The processor 120 may analyze participants in the collaborative task, and may transmit information on whether there is one participant or one or more participants to a participant selection module (e.g., the participant selection module 520 in FIG. 5). The processor 120 may transmit, to the participant selection module 520, information on whether to perform the collaborative task or participant information (e.g., names). Alternatively, if the processor 120 fails to analyze the participants, the processor 120 may transmit only the information on whether to perform the collaborative task to the participant selection module 520.

In operation 605, the processor 120 (e.g., the participant selection module 520 in FIG. 5) may select participants, based on the collaborative task. The processor 120 may receive, from the user, a user input for selecting participants in the collaborative task. To this end, the processor 120 may provide a user interface for selecting participants in the collaborative task. For example, the processor 120 may receive, from the collaboration dispatcher module 510, the information on whether to perform the collaborative task or the participant information. When the collaboration dispatcher module 510 determines to perform the collaborative task, the processor 120 may provide a user interface for selecting participants on a display (e.g., the display device 160 in FIG. 1).

For example, if it is analyzed (recognized or identified) that there is one participant, the processor 120 may provide contact information corresponding to the analyzed participant. Alternatively, if it is analyzed that there are two or more participants, the processor 120 may provide a contact list corresponding to the analyzed participants. According to various embodiments, if only the information on whether to perform the collaborative task is received from the collaboration dispatcher module 510, and if the participant information is not received, the processor 120 may inquire about the participants. The processor 120 may provide contact information stored in the electronic device 101 or user information registered in a messenger application in order to select the participants. The processor 120 may transmit at least one piece of selected participant information (e.g., phone numbers) to the intelligent server 201.

In operation 607, the processor 120 (e.g., the collaboration management module 540 in FIG. 5) may collect information related to the collaborative task. To this end, the processor 120 (e.g., the user search module 530 in FIG. 1) may identify whether the electronic device (e.g., the electronic device 102 or the electronic device 104 in FIG. 1) of at least one participant provides a voice agent function. The processor 120 may receive participant information from the collaboration dispatcher module 510, and may identify whether the electronic device of the participant provides a voice agent function, based on the participant information.

The processor 120 may store information on the electronic device (e.g., a phone number and a device identifier) that provides a voice agent function in a personal information database (or the memory 130 or the capsule DB 230). In the case where the participant corresponding to the participant information is retrieved from the personal information database by interworking with the intelligent server 201, the processor 120 may determine that the electronic device of the participant provides a voice agent function. In the case where the participant corresponding to the participant information is not retrieved from the personal information database, the processor 120 may determine that the electronic device of the participant does not provide a voice agent function.

According to various embodiments, the processor 120 may collect information related to the collaborative task through interaction between the user and at least one participant. The information related to the collaborative task may include at least one of domains, actions, or parameters. The domains may indicate applications (e.g., a beverage order application and a hotel reservation application) installed in the electronic device 101 (or the electronic device 102). The actions may indicate specific functions to be performed (e.g., order a drink at the location XX) in the applications.

The parameters may be information (e.g., names, types (e.g., hot/ice), and sizes of beverages and the like) that is used to perform the specific functions in the applications. The domains or the actions may be configured, added, changed, or deleted by the user or at least one participant. The parameters may be received from the user or the participant, respectively, and the parameters of the user and the participant may be the same or different. The processor 120 may determine an information collection method to collect the information, based on whether the electronic device of the participant provides a voice agent function.

For example, if it is determined that the participant provides a voice agent function, the processor 120 may collect information for the collaborative task using the voice agent function in the electronic device of the participant. The information collection method using the voice agent function may be providing a user interface for collecting information to the electronic device of the participant, or may be providing a voice for collecting information (e.g., an utterance by text-to-speech). The user interface may include at least one of text, images, and videos.

Alternatively, if it is determined that the participant does not provide a voice agent function, the processor 120 may perform control to send a message (or messenger) including link information for providing a voice agent function to the electronic device of the participant. If the link information is selected by the participant, the processor 120 may provide a web page that provides the voice agent function, thereby collecting information through the web page. The web page may provide a user interface or a voice (e.g., a TTS utterance) for collecting information.

In operation 609, the processor 120 (e.g., the collaboration management module 540) may produce a collaborative task, based on the collected information. The processor 120 may collect information obtained from dialogs between the user and at least one participant. The processor 120 may produce (or manage) the collaborative task, based on the collected information. The collaborative task production method may include at least one of a method in which the participant corrects a collaborative task, based on a user utterance (e.g., an initial command) in the electronic device 101, a method in which the user and the participant enter a collaborative task, respectively, or a method in which the user and the participant interact to configure a collaborative task.

In the participant correction method, the processor 120 may collect information related to the collaborative task (e.g., domains, actions, and parameters), based on the user voice (or text data converted from the user voice), may provide the collected information to the participant, and may correct the information related to the collaborative task, based on a participant input. When the production of the collaborative task is completed through the correction of the participant, the processor 120 may transmit the produced collaborative task to the collaboration execution module 550. In the participant input method, the processor 120 may collect first information related to the collaborative task (e.g., collaborative task information of the user), based on the user voice, may collect second information related to the collaborative task (e.g., collaborative task information of the participant) from the participant, and may produce a collaborative task using the first information and the second information. In the collaborative task configuration method, the processor 120 may collect information related to the collaborative task (e.g., domains, actions, and parameters) through a dialog between the user and the participant, thereby producing the collaborative task.

According to various embodiments, the processor 120 may analyze the collaborative task, and may differently determine the processing method thereof depending on whether any one piece of information in the collaborative task corresponds to a single choice or multiple choices. According to various embodiments, the processor 120 may provide information collected in relation to the collaborative task to the user or at least one participant. The collected information may include at least one piece of current command information (e.g., order coffee), request information (e.g., choice of a coffee item), or dialog history information. The processor 120 may provide the collected information through at least one method of providing template phrases for cases, providing a common template phrase, or displaying a table.

In operation 611, the processor 120 (e.g., the collaboration execution module 550 in FIG. 5) may execute the collaborative task. The processor 120 may execute the collaborative task, based on the collaborative task produced using the collected information. The processor 120 may provide the collected information to the user or at least one participant, and may receive confirmation for execution of the collaborative task from the user or at least one participant. The processor 120 may change a representative to execute the collaborative task, based on an input from the user or at least one participant. For example, the processor 120 may configure the user who speaks first as a representative, or may configure a participant other than the user as a representative, based on an input by at least one participant. The processor 120 may transmit information for executing the collaborative task to the electronic device of the representative who executes the collaborative task, and may provide an execution result thereof to the participants other than the representative.

Figure 7:
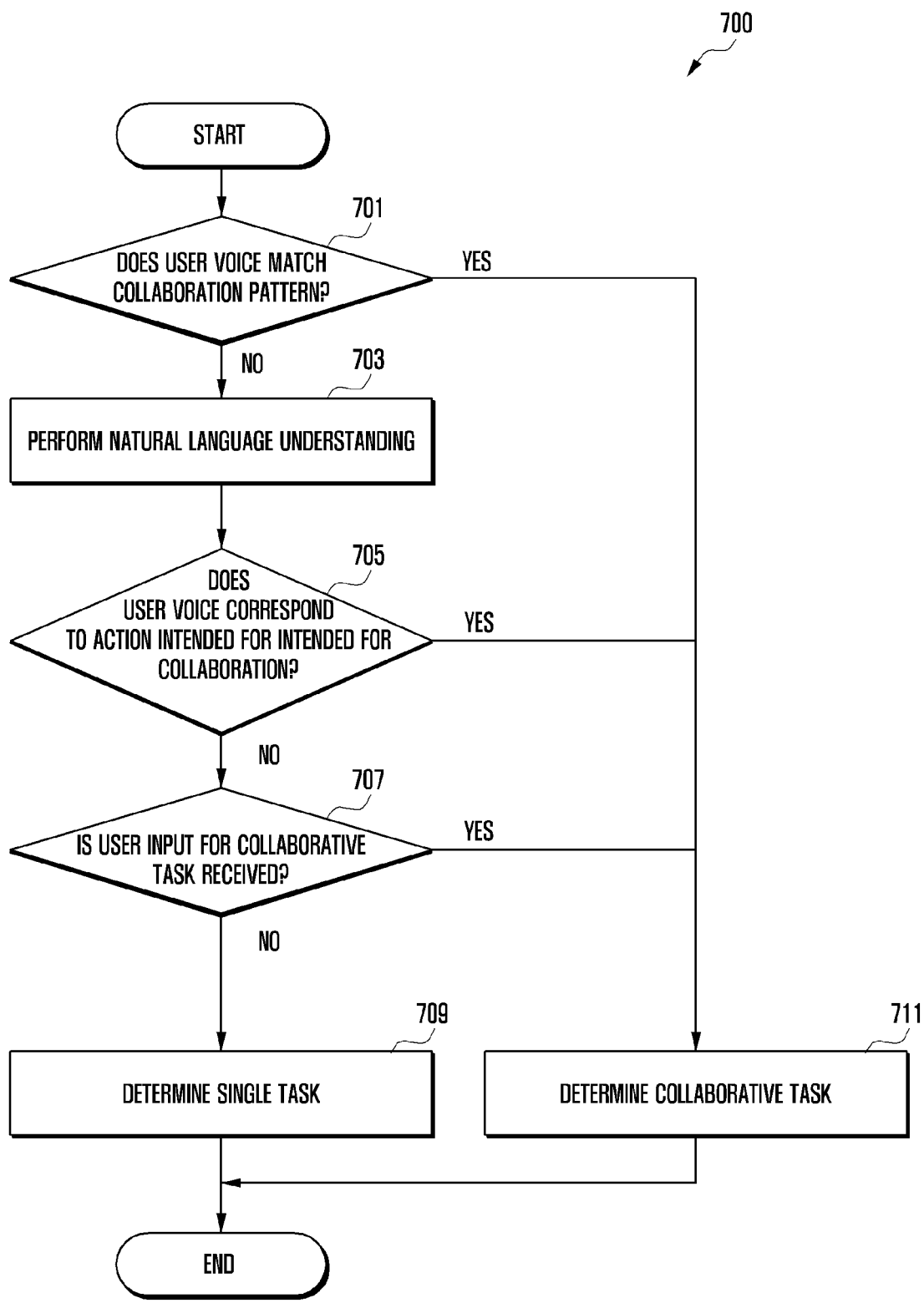
FIG. 7 illustrates a flowchart of a method for determining a collaborative task of an electronic device according to various embodiments.

FIG. 7 illustrates a flowchart 700 of a method for determining a collaborative task of an electronic device according to various embodiments. The flowchart in FIG. 7 may be details of operation 603 in FIG. 6.

Referring to FIG. 7, in operation 701, a processor (e.g., the processor 120 in FIG. 1) of an electronic device (e.g., the electronic device 101 in FIG. 1) according to various embodiments may determine whether the user voice matches a collaboration pattern. The collaboration pattern may be pre-stored in the memory 130 of the electronic device 101 or a capsule DB (e.g., the capsule DB 230 in FIG. 2) of an intelligent server (e.g., the intelligent server 201 in FIG. 2). The processor 120 may determine whether the user voice, which is converted into text data by the client module 137 or the automatic speech recognition module 221 of the intelligent server 201, matches the collaboration pattern. The processor 120 may determine whether the user voice matches the collaboration pattern one-to-one (e.g., rule matching) or partially matches the same (e.g., matching of 50% or more). If the user voice matches the collaboration pattern, the processor 120 may perform operation 711, and if the user voice does not match the collaboration pattern, the processor 120 may perform operation 703.

In operation 703 performed when the user voice does not match the collaboration pattern, the processor 120 may perform natural language understanding using a natural language understanding module (e.g., the natural language understanding module 223 in FIG. 2). The processor 120 may perform natural language understanding by interworking with the intelligent server 201. The natural language understanding module 223 may recognize the intention of the user using the converted text data. For example, the natural language understanding module 223 may recognize the intention of the user by performing syntactic analysis or semantic analysis. The natural language understanding module 223 may recognize the meaning of a word extracted from the voice input using the linguistic features (e.g., syntactic elements) of morphemes or phrases, and may match the recognized meaning of the word with the intention, thereby determining the intention of the user.

In operation 705, the processor 120 (e.g., the collaboration dispatcher module 510 in FIG. 5) may determine whether the user voice corresponds to an action intended for collaboration (e.g., order a drink, book accommodation, or the like). The processor 120 may determine whether the intention of the user identified through natural language understanding corresponds to an action intended for collaboration. The processor 120 may perform operation 711 if the user voice corresponds to an action intended for collaboration, and may perform operation 707 if the user voice does not correspond to an action intended for collaboration.

In the case where the user voice does not correspond to an action intended for collaboration, in operation 707, the processor 120 (e.g., the collaboration dispatcher module 510 in FIG. 5) may determine whether a user input for a collaborative task is received. The user input may include selection of a specific button (e.g., a physical button or a software button) of the electronic device 101 or a specific wake-up utterance. The user input for a collaborative task may be pre-stored in the memory 130 or the capsule DB 230. The processor 120 may determine whether a user input, which is received together with the user voice from the user, corresponds to the user input stored in the capsule DB 230.

Alternatively, the processor 120 may determine whether a user input for a collaborative task is further received. The processor 120 may determine whether a user input, which is further received after receiving the user utterance, corresponds to the user input stored in the memory 130 or the capsule DB 230. The processor 120 may perform operation 711 if a user input for a collaborative task is received, and may perform operation 709 if a user input for a collaborative task is not received.

In operation 709 performed when a user input for a collaborative task is not received, the processor 120 (e.g., the collaboration dispatcher module 510) may determine that the user voice corresponds to a single task. If the single task is determined, the processor 120 may perform a general process on the user voice as usual.

In operation 711, the processor 120 (e.g., the collaboration dispatcher module 510) may determine that the user voice corresponds to a collaborative task. For example, in at least one of the cases where the user voice matches the collaboration pattern, where the user voice corresponds to an action intended for collaboration, and where a user input for a collaborative task is received, the processor 120 may determine that the user voice corresponds to the collaborative task. If the collaborative task is determined, the processor 120 may perform operation 605 in FIG. 6.

According to various embodiments, the collaboration dispatcher module 510 may transmit information on whether to perform the collaborative task to a participant selection module (e.g., the participant selection module 520 in FIG. 5). If the collaborative task is determined, the collaboration dispatcher module 510 may inform the participant selection module 520 of the collaborative task. The collaboration dispatcher module 510 may analyze the participants in the collaborative task, and may transmit information on whether there is one participant or one or more participants to the participant selection module 520. The collaboration dispatcher module 510 may transmit, to the participant selection module 520, information on whether to perform the collaborative task or participant information (e.g., names). Alternatively, if the collaboration dispatcher module 510 fails to analyze the participants, the collaboration dispatcher module 510 may transmit only the information on whether to perform the collaborative task to the participant selection module 520.

Figure 8:
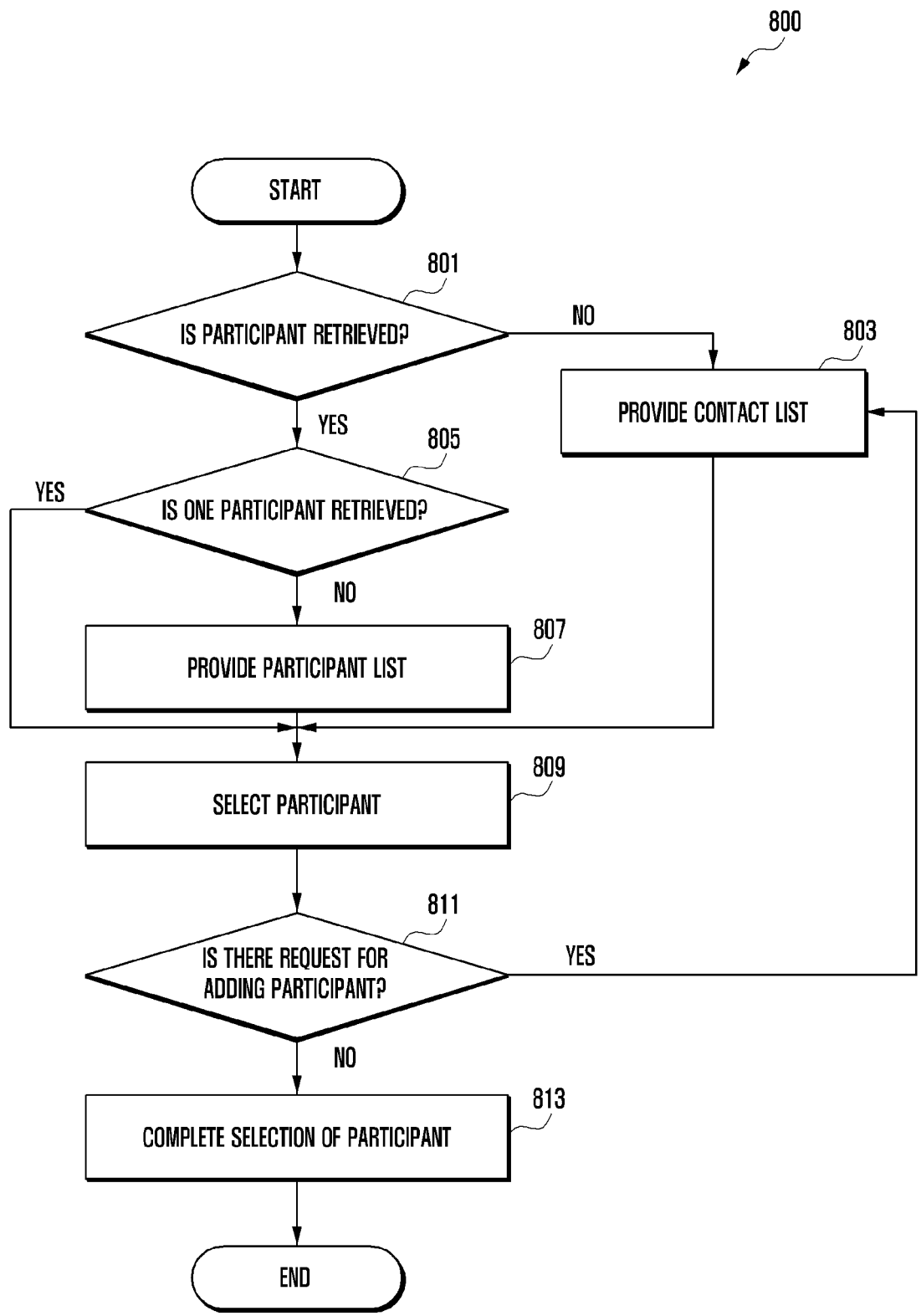
FIG. 8 illustrates a flowchart of a method for selecting a participant by an electronic device according to various embodiments.

FIG. 8 illustrates a flowchart 800 of a method for selecting a participant of an electronic device according to various embodiments. The flowchart 800 in FIG. 8 may be details of operation 605 in FIG. 6. The flowchart 800 in FIG. 8 may be similar to the flowchart 900 in FIG. 9, and may show an operation of selecting participants through a user interface in the electronic device 101.

Referring to FIG. 8, in operation 801, a processor 120 (e.g., the participant selection module 520 in FIG. 5) of an electronic device (e.g., the electronic device 101 in FIG. 1) according to various embodiments may determine whether a participant is retrieved. The processor 120 may receive participant information from the collaboration dispatcher module 510. The processor 120 may retrieve participant information from contact information stored in a memory (e.g., the memory 130 in FIG. 1) of the electronic device 101. The processor 120 may transmit participant information to the electronic device 101, and may receive information on whether participant information is retrieved. Alternatively, the processor 120 may receive contact information from the user, and may retrieve participant information from the received contact information.

The processor 120 may perform operation 805 if the participant is retrieved, and may perform operation 803 if no participant is retrieved.

If no participant is retrieved, in operation 803, the processor 120 (e.g., the participant selection module 520) may provide a contact list to the electronic device 101 of the user. The processor 120 may allow the user of the electronic device 101 to directly select a participant in the collaborative task. The contact list may include a list of phone numbers stored in the electronic device 101 or a list of users registered in a messenger (or message) application. The processor 120 may display a user interface including the contact list on a display (e.g., the display device 160). The processor 120 may receive, from the user, a selection for at least one participant from the contact list, and may transmit the selected participant information to the intelligent server 201. The processor 120 may perform operation 809 when receiving the participant information.

If the participant is retrieved, in operation 805, the processor 120 may determine whether there are one or more retrieved participants. The processor 120 may perform operation 809 if there is one retrieved participant, and may perform operation 807 if there is a plurality of retrieved participants.

In operation 807 performed in the case where there is a plurality of retrieved participants, the processor 120 (e.g., the participant selection module 520) may provide a participant list. The participant list may include information on two or more participants. The processor 120 may display a user interface including the participant list on the display device 160. Alternatively, the processor 120 may output a voice corresponding to the participant information (e.g., names, phone numbers, and IDs) included in the participant list through a speaker (e.g., the sound output device 155). The processor 120 may receive, from the user, a selection for at least one participant from the participant list, and may transmit the selected participant information to the intelligent server 201. Upon receiving participant information, the processor 120 may perform operation 809.

In operation 809, the processor 120 (e.g., the participant selection module 520) may select a participant. The processor 120 may select one participant retrieved in operation 805 as a participant in the collaborative task. The processor 120 may perform operation 803 or operation 807, thereby selecting at least one participant selected by the user of the electronic device 101 as a participant in the collaborative task.

In operation 811, the processor 120 (e.g., the participant selection module 520) may identify (or determine) whether there is a request for adding a participant. The request for adding a participant may correspond to a user input received from the electronic device 101. For example, if a specific button (or a gesture input) is selected by the user, or if a specific voice (e.g., "One more!" or "Add!") is received, the processor 120 may determine that there is a request for adding a participant. The processor 120 may return to operation 803 if there is a request for adding a participant, and may perform operation 813 if there is no request for adding a participant. The processor 120 may return to operation 803 to provide the contact list.

In operation 813 performed in the case where there is no request for adding a participant, the processor 120 (e.g., the participant selection module 520) may complete the selection of the participants. The processor 120 may complete the selection of participants to perform the collaborative task, based on a user input. The processor 120 may identify whether the electronic device (e.g., the electronic device 102 or the electronic device 104 in FIG. 1) of the participant selected using a user search module (e.g., the user search module 530 in FIG. 5) provides a voice agent function. If the participant corresponding to the participant information is retrieved from the personal information database of the intelligent server 201, the processor 120 may determine that the electronic device of the participant provides a voice agent function. If the participant corresponding to the participant information is not retrieved from the personal information database, the processor 120 may determine that the electronic device of the participant does not provide a voice agent function. After identifying whether the participant provides a voice agent function, the processor 120 may perform operation 607. The processor 120 may transmit information on whether the participant provides a voice agent function to a collaboration management module (e.g., the collaboration management module 540 in FIG. 5).

Figure 9:
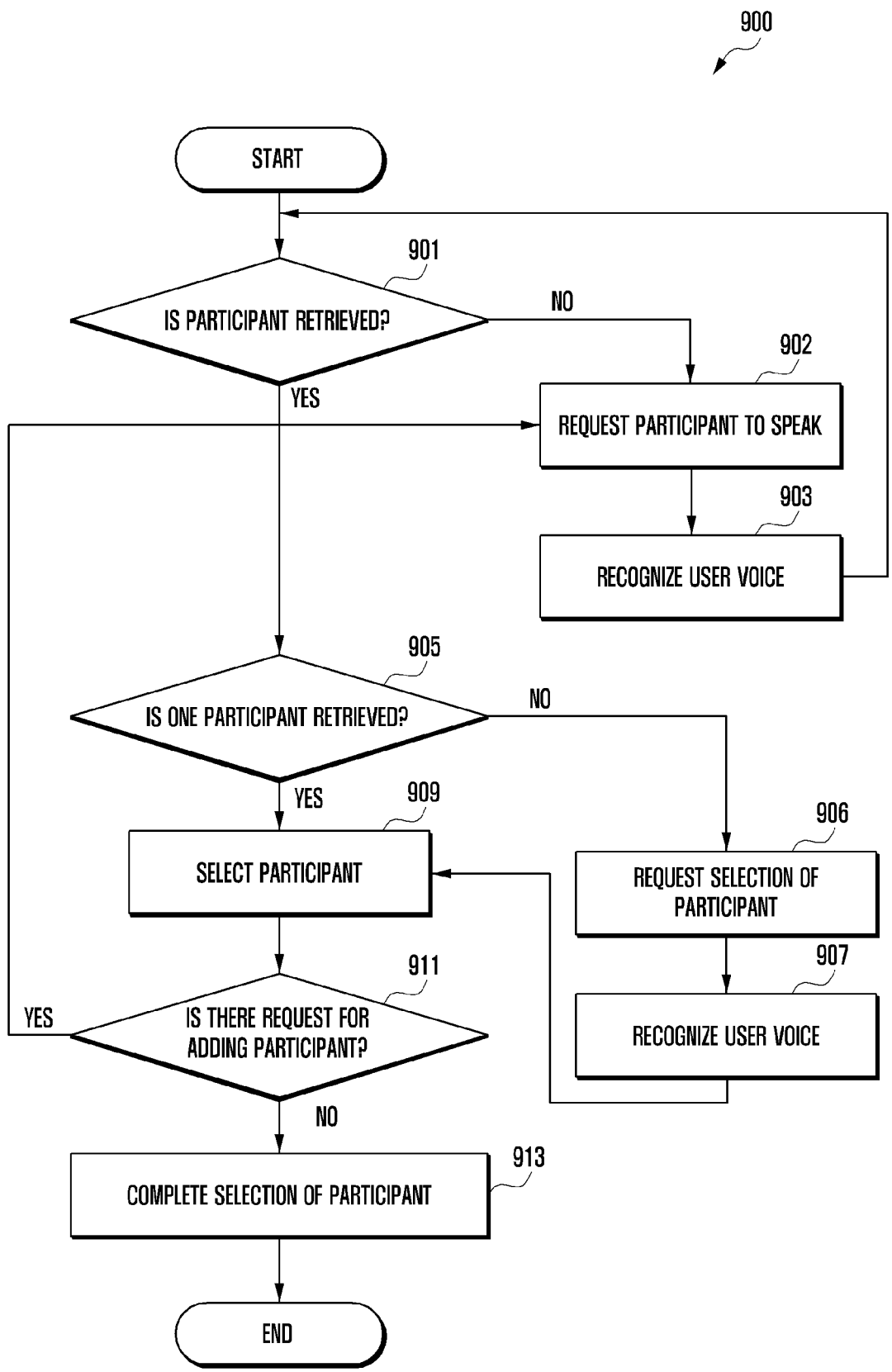
FIG. 9 illustrates a flowchart of a method for selecting a participant using a voice command of an electronic device according to various embodiments.

FIG. 9 illustrates a flowchart 900 of a method for selecting a participant using a voice command of an electronic device according to various embodiments. The flowchart 800 in FIG. 8 may be details of operation 605 in FIG. 6. The flowchart 900 in FIG. 9 may be similar to the flowchart 800 in FIG. 8, and may be an operation of selecting a participant using a voice command in the electronic device 101. Accordingly, a detailed description of the operations similar to those in FIG. 8 may be omitted.

Referring to FIG. 9, in operation 901, a processor (e.g., the processor 120 in FIG. 1) (e.g., the participant selection module 520 in FIG. 5) of an electronic device (e.g., the electronic device 101 in FIG. 1) according to various embodiments may determine whether a participant is retrieved. The processor 120 may receive participant information from the collaboration dispatcher module 510. The processor 120 may retrieve participant information from contact information stored in the electronic device 101 of the user. Since operation 901 is the same as or similar to operation 801 in FIG. 8, a detailed description thereof may be omitted.

The processor 120 may perform operation 905 if the participant is retrieved, and may perform operation 902 if no participant is retrieved.

In operation 902 performed in the case where no participant is retrieved, the processor 120 (e.g., the participant selection module 520) may request the user of the electronic device 101 to speak about a participant. The processor 120 may request the user to directly select a participant in the collaborative task. The processor 120 may interwork with an intelligent server (e.g., the intelligent server 201 in FIG. 2) to request the user to select a participant. For example, a text-to-speech module (e.g., the text-to-speech module 229 in FIG. 2) of the intelligent server 201 may convert text "Will you speak about a participant?" into a voice. The intelligent server 201 may transmit the converted voice signal to the electronic device 101. The processor 120 may output the voice signal received from the intelligent server 201 through a speaker (e.g., the sound output device 155). The processor 120 may receive participant information (e.g., names and phone numbers) in response to the output voice from the user through a microphone (e.g., the input device 150 in FIG. 1). The processor 120 may transmit a user voice corresponding to the received participant information to the intelligent server 201.

In operation 903, the processor 120 (e.g., the participant selection module 520) may recognize the user voice. The processor 120 may convert the user voice corresponding to the participant information into text data through an automatic speech recognition module (e.g., the automatic speech recognition module 221 in FIG. 2). The processor 120 may return to operation 901 after voice recognition. The processor 120 may perform operation 901 to retrieve the converted text data, as participant information, from contact information stored in the electronic device 101.

If the participant is retrieved, in operation 905, the processor 120 (e.g., the participant selection module 520) may determine whether there are one or more retrieved participants. Since operation 905 is the same as or similar to operation 905 in FIG. 8, a detailed description thereof may be omitted. The processor 120 may perform operation 909 if there is one retrieved participant, and may perform operation 906 if there is a plurality of retrieved participants.

In the case where there is a plurality of retrieved participants, in operation 906, the processor 120 (e.g., the participant selection module 520) may request selection of participants. The processor 120 may interwork with the intelligent server 201 to convert the retrieved participant information into a voice. The intelligent server 201 may convert the retrieved participant information into a voice using a text-to-speech module (e.g., the text-to-speech module 229 in FIG. 2). For example, in the case where there are two retrieved participants, Jack and Mark, the intelligent server 201 may transmit a voice signal saying "Do you select Jack and Mark as participants?" to the electronic device 101. The processor 120 may output the voice signal received from the intelligent server 201 through the sound output device 155.

In operation 907, the processor 120 (e.g., the participant selection module 520) may recognize the user voice. The processor 120 may convert the user voice corresponding to the participant information into text data through the automatic speech recognition module 221. The processor 120 may perform operation 909 after voice recognition.

In operation 909, the processor 120 (e.g., the participant selection module 520) may select a participant. The processor 120 may select one participant retrieved in operation 901 as a participant in the collaborative task. The processor 120 may perform operation 903 or operation 907 to select at least one participant selected by the user as a participant in the collaborative task. Operation 909 may be the same as or similar to operation 809 in FIG. 8.

In operation 911, the processor 120 (e.g., the participant selection module 520) may identify (or determine) whether there is a request for adding a participant. The request for adding a participant may correspond to a user input received from the user. For example, if a specific button (or a gesture input) is selected by the user, or if a specific voice (e.g., "One more!" or "Add!") is received therefrom, the processor 120 may determine that there is a request for adding a participant. The processor 120 may return to operation 902 if there is a request for adding a participant, and may perform operation 913 if there is no request for adding a participant. The processor 120 may return to operation 902 to request the user to speak about a participant. Operation 911 may be the same as or similar to operation 811 in FIG. 8.

If there is no request for adding a participant, in operation 913, the processor 120 (e.g., the participant selection module 520) may complete the selection of the participants. The processor 120 may complete the selection of the participants to perform the collaborative task with the user of the electronic device 101. The processor 120 may transmit the selected participant information to the intelligent server 201, and may identify whether the electronic device of the selected participant provides a voice agent function. For example, the intelligent server 201 may identify whether the electronic device (e.g., the electronic device 102 or the electronic device 104 in FIG. 1) of the participant selected using a user search module (e.g., the user search module 530 in FIG. 5) provides a voice agent function. Operation 913 may be the same as or similar to operation 813 in FIG. 8.

Figure 10:
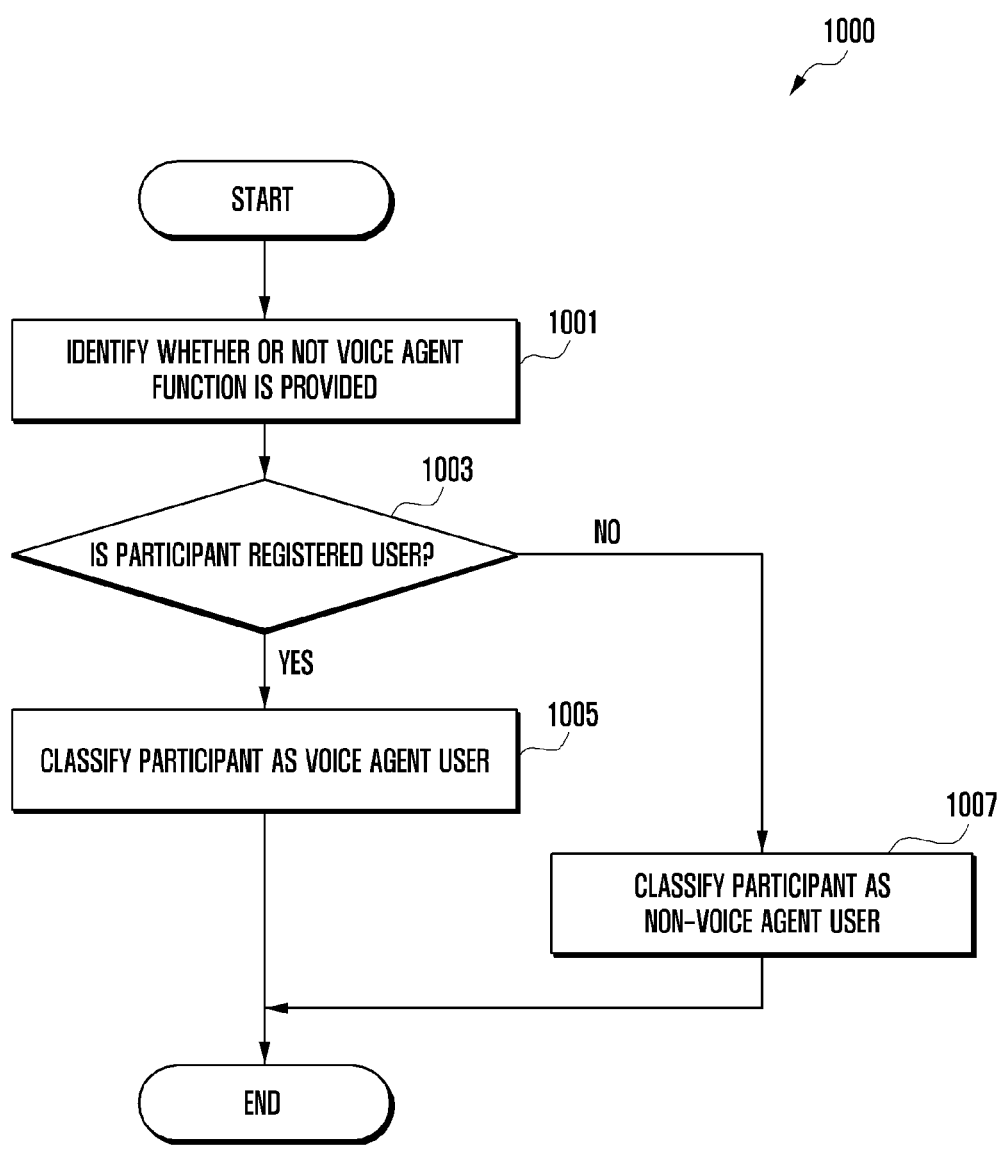
FIG. 10 illustrates a flowchart of a method in which an electronic device determines whether or not a participant voice agent is registered according to various embodiments.

FIG. 10 illustrates a flowchart 1000 of a method in which an electronic device determines whether a participant voice agent is registered according to various embodiments. FIG. 10 may be performed after performing operation 605 in FIG. 6, or after performing the flowchart 800 in FIG. 8 or the flowchart 900 in FIG. 9.

Referring to FIG. 10, in operation 1001, a processor (e.g., the processor 120 in FIG. 1) (e.g., the user search module 530 in FIG. 5) of an electronic device (e.g., the electronic device 101 in FIG. 1) according to various embodiments may identify whether a voice agent function is provided. Although the user search module 530 is described as being included in the electronic device 101 in the disclosure, the user search module 530 may be included in the intelligent server 201 or a separate server (e.g., a personal information server). The processor 120 may identify whether an electronic device of at least one participant provides a voice agent function by interworking with the personal information server or the intelligent server 201. The processor 120 may receive participant information from a participant selection module (e.g., the participant selection module 520 in FIG. 5), and, based on the participant information, may identify whether the electronic device (e.g., the electronic device 102 or the electronic device 104 in FIG. 1) of the participant provides a voice agent function.

In operation 1003, the processor 120 (e.g., the user search module 530) may determine whether the selected participant is a user registered in the personal information database. The intelligent server 201 may store information (e.g., phone numbers and device identifiers) of electronic devices that provide a voice agent function in the personal information database (or the capsule DB 230 in FIG. 5). The processor 120 may transmit the selected participant information to the intelligent server 201, and the intelligent server 201 may retrieve the transmitted participant information from the personal information database. The intelligent server 201 may transmit a retrieved result to the electronic device 101. The processor 120 may perform operation 1005 if the selected participant is retrieved from the personal information database, and may perform operation 1007 if the selected participant is not retrieved.

If the selected participant is a registered user, in operation 1005, the processor 120 (e.g., the user search module 530) may determine that the electronic device of the selected participant provides a voice agent function. The processor 120 may collect information related to the collaborative task from the electronic device of the participant using the voice agent function.

If the selected participant is not a registered user, in operation 1007, the processor 120 (e.g., the user search module 530) may determine that the electronic device of the selected participant does not provide a voice agent function. The processor 120 may perform control to provide a message (or a messenger) including link information for providing a voice agent function to the electronic device of the participant when collecting information related to the collaborative task. When the link information is selected by the participant, the processor 120 may provide a web page that provides a voice agent function, and may collect information through the web page. The web page may provide a user interface or a voice (e.g., a TTS utterance) for collecting information.

Figure 11:
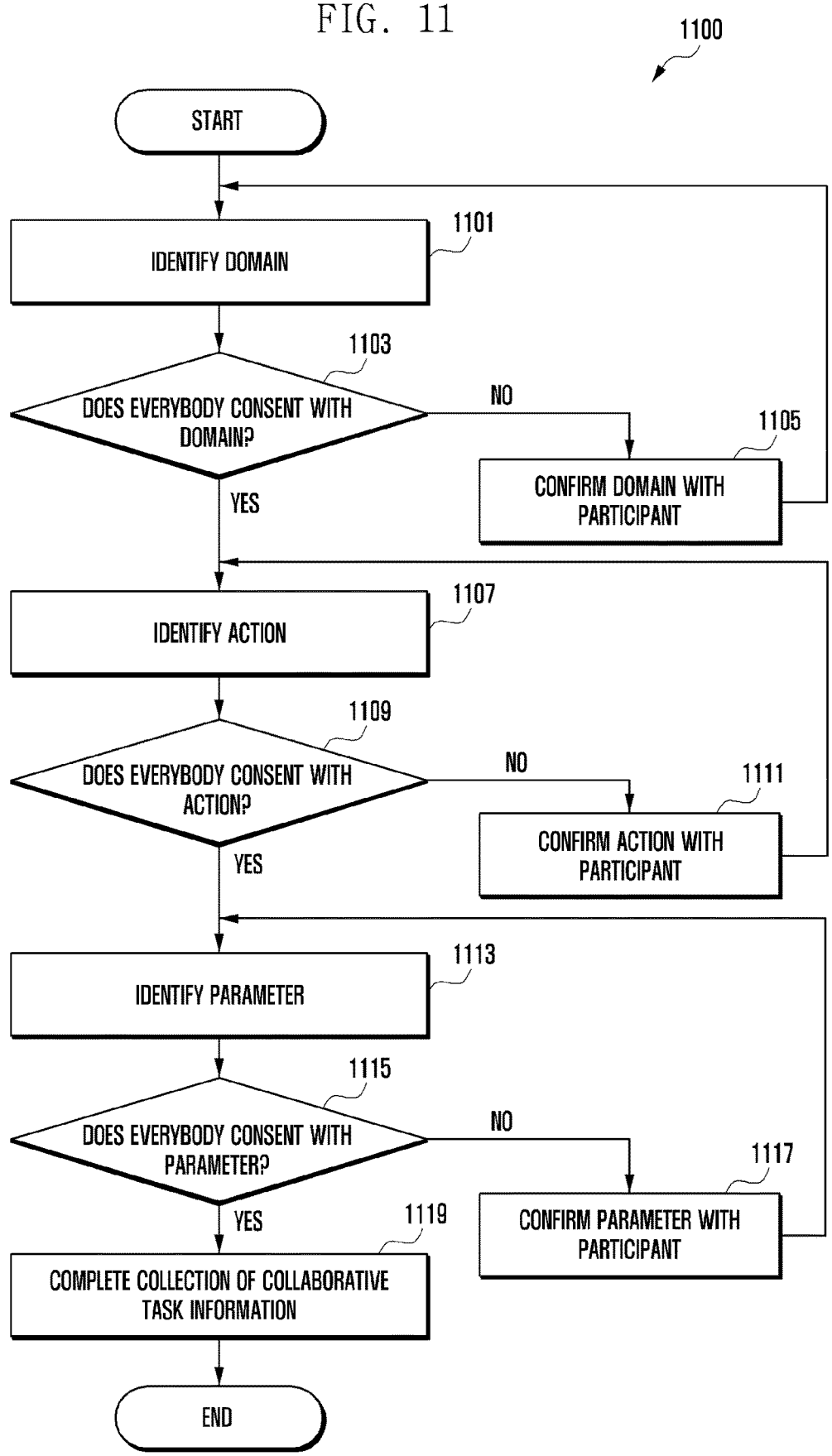
FIG. 11 illustrates a flowchart of a method for collecting information by an electronic device according to various embodiments.

FIG. 11 illustrates a flowchart 1100 of a method for collecting information by an electronic device according to various embodiments. The flowchart in FIG. 11 may be details of operation 607 in FIG. 6. For example, the information collection method in FIG. 11 may be a method in which a user and a participant interact to configure a collaborative task.

Referring to FIG. 11, in operation 1101, a processor (e.g., the processor 120 in FIG. 1) (e.g., the collaboration management module 540 in FIG. 5) of an electronic device (e.g., the electronic device 101 in FIG. 1) according to various embodiments may identify domains. The processor 120 may identify domains, based on the user voice in FIG. 6. The domains are information related to the collaborative task, and may indicate, for example, applications (e.g., a beverage order application and a hotel reservation application) installed in the electronic device 101 (or the electronic device 102). The domains may be stored in a memory (e.g., the memory 130 in FIG. 1) of the electronic device 101 or a capsule DB (e.g., the capsule DB 230 in FIG. 2) of an intelligent server (e.g., the intelligent server 201 in FIG. 2). The processor 120 may identify domains by interworking with the intelligent server 201.

The capsule DB 230 may store information on a relationship between a plurality of concepts and operations, which correspond to a plurality of domains. The processor 120 may retrieve (or identify) domains such as "coffee", "order", "reservation", "hotel", and "airplanes" from the capsule DB 230 in response to the user voice (e.g., the user voice recognized in operation 601) converted into text. For example, for the user voice saying "Ask Mark (e.g., the participant) if he wants coffee", the collaboration management module 540 may identify a coffee order application as a domain.

In operation 1103, the processor 120 (e.g., collaboration management module 540) may identify whether everybody consents with the domain. The processor 120 may provide the identified domain (or the collected information) to the user or at least one participant. For example, the processor 120 may provide the electronic device (e.g., the electronic device 102) of at least one participant (e.g., Mark) with a user interface or a voice saying "Would you like to have coffee with Sujan (e.g., the user)". The domain may be configured, added, changed, or deleted by the user or at least one participant. The processor 120 may receive a response to the provided information from the user or the electronic device 102 of participant. Based on the response, the processor 120 may perform operation 1107 if both the user and the at least one participant consent with the domain, and may perform operation 1105 if neither the user nor the at least one participant consents with the domain.

According to various embodiments, the collaboration management module 540 may analyze the collaborative task, and may differently determine the processing method thereof depending on whether any one piece of information in the collaborative task corresponds to a single choice or multiple choices. Since the domain indicates an application to be executed, the collaboration management module 540 may process the domain as a single choice. If there is a difference in choices between the user and at least one participant, the collaboration management module 540 may repeatedly provide additional questions until the choices match each other. If the additional questions are repeated a predetermined number of times or more, the collaboration management module 540 may make a decision by a majority vote between the user and the participant, or may appoint a representative participant through a dialog between the participants so that the appointed representative makes a decision.

If nobody consents with the identified domain, in operation 1105, the processor 120 (e.g., the collaboration management module 540) may confirm the domain with the participant. The processor 120 may transmit a user interface display or a voice output related to confirmation of the identified domain to the electronic device 102 of the participant through a communication module (e.g., the communication module 190 in FIG. 1). In the case where the electronic device 102 of the participant provides a voice agent function, the processor 120 may instruct the electronic device 102 of the participant to output a voice related to the confirmation of a domain. In the case where the electronic device 102 of the participant does not provide a voice agent function, the processor 120 may transmit, to the electronic device 102 of the participant, link information providing a temporary voice agent function. Upon receiving an input related to the confirmation of a domain from the electronic device 102 of the participant, the processor 120 may return to operation 1101 to identify the domain.

If everybody consents with the identified domain, in operation 1107, the processor 120 (e.g., the collaboration management module 540) may identify actions. The collaboration management module 540 may identify actions, based on the user voice in FIG. 6 or the participant input (e.g., a touch input or a voice input) obtained in operation 1103 or operation 1105. The actions may indicate specific functions (e.g., order a drink at the location XX or book accommodation at the location OO) to be performed in the identified domain (e.g., the application). The actions may be configured, added, changed, or deleted by the user or at least one participant. The actions may be stored in the capsule DB 230 of the intelligent server 201. For example, the collaboration management module 540 may receive a voice saying "A cup of Americano at Star Valley (e.g., the order place)?" from the participant (e.g., Mark), and, based on the received voice, may provide the user (e.g., Sujan) with a user interface or a voice such as "Mark ordered an Americano from Star Valley."

The collaboration management module 540 may perform retrieval on (or identify) whether the user voice or the participant voice converted into text corresponds to information related to "places" or information related to "functions" through the capsule DB 230. Alternatively, the collaboration management module 540 may perform retrieval on whether a user input (e.g., a button input, a touch input, etc.) obtained from the electronic device 101 of the user or a participant input (e.g., a button input, a touch input, etc.) obtained from the electronic device 102 of the participant, as well as the user voice, corresponds to information related to "places" or information related to "functions" through the capsule DB 230.

In operation 1109, the processor 120 (e.g., the collaboration management module 540) may identify whether everybody consents with the action. The processor 120 may provide the identified action to the user or at least one participant. The processor 120 may provide the identified action to the user, or may transmit the same to the electronic device (e.g., the electronic device 102) of at least one participant. The processor 120 may receive a response to the identified action from the user or the electronic device 102 of the participant. Based on the response, the processor 120 may perform operation 1113 if both the user and the least one participant consent with the action, and may perform operation 1111 if neither the user nor the at least one participant consents with the action.

According to various embodiments, the collaboration management module 540 may analyze the collaborative task, and may differently determine the processing method thereof depending on whether any one piece of information in the collaborative task corresponds to a single choice or multiple choices. Since the action relates to a specific function of the application to be executed, the collaboration management module 540 may process the action as a single choice. Alternatively, the collaboration management module 540 may process the action as multiple choices according to configuration of the user requesting the collaborative task. If there is a difference in choices between the user and at least one participant, the collaboration management module 540 may repeatedly provide additional questions until the choices match each other. If the additional questions are repeated a predetermined number of times or more, the collaboration management module 540 may make a decision by a majority vote between the user and the participant, or may appoint a representative participant through a dialog between the participants so that the appointed representative makes a decision.

According to various embodiments, if there is a difference in choices for the information requiring a single choice (e.g., the action (e.g., the order place)) between the participants, the collaboration management module 540 may repeatedly provide additional questions until the choices match each other. If the additional questions are repeated a predetermined number of times or more, the collaboration management module 540 may make a decision by a majority vote between the user and the participant, or may appoint a representative participant through a dialog between the participants so that the appointed representative makes a decision.

If nobody consents with the identified action, in operation 1111, the processor 120 (e.g., the collaboration management module 540) may confirm the action with the participant. The processor 120 may transmit a user interface display or a voice output related to confirmation of the identified action to the electronic device 102 of the participant. In the case where the electronic device 102 of the participant provides a voice agent function, the processor 120 may instruct the electronic device 102 of the participant to output a voice related to the confirmation of the action. In the case where the electronic device 102 of the participant does not provide a voice agent function, the processor 120 may transmit, to the electronic device 102 of the participant, link information providing a temporary voice agent function. Upon receiving an input related to the confirmation of the action from the electronic device 102 of the participant, the processor 120 may return to operation 1107 to identify the action.

If everybody consents with the identified action, in operation 1113, the processor 120 (e.g., the collaboration management module 540) may identify parameters. The processor 120 may identify parameters, based on the user voice in FIG. 6 or the participant input (e.g., a touch input or a voice input) obtained in at least one of the operations 1103 to 1111. The parameters may be information (e.g., names, types (e.g., hot/ice), and sizes of beverages and the like) that is used to perform the specific function in the application. The parameters may be respectively received from the user or the participant, and the parameters of the user and the participant may be the same or different. The processor 120 may identify parameters in response to the user voice converted into text or a participant input.

In operation 1115, the processor 120 (e.g., collaboration management module 540) may identify whether everybody consents with the parameters. The processor 120 may provide the identified parameters to the user or at least one participant. The processor 120 may receive a response to the identified parameters from the user or the electronic device 102 of the participant. Based on the response, the processor 120 may perform operation 1119 if both the user and the least one participant consent with the parameters, and may perform operation 1117 if neither the user nor the at least one participant consents with the parameters.

If nobody consents with the identified parameters, in operation 1117, the processor 120 (e.g., the collaboration management module 540) may confirm the parameters with the participant. The processor 120 may transmit a user interface display or a voice output related to confirmation of the identified parameters to the electronic device 102 of the participant. In the case where the electronic device 102 of the participant provides a voice agent function, the processor 120 may instruct the electronic device 102 of the participant to output a voice related to the confirmation of the action. In the case where the electronic device 102 of the participant does not provide a voice agent function, the processor 120 may transmit, to the electronic device 102 of the participant, link information providing a temporary voice agent function. Upon receiving an input related to the confirmation of the parameters from the electronic device 102 of the participant, the processor 120 may return to operation 1113 to identify the parameters.

If everybody consents with the identified parameters, in operation 1119, the processor 120 (e.g., the collaboration management module 540) may complete collection of the collaborative task information. The processor 120 may produce a collaborative task, based on the collected information. The processor 120 may collect information obtained from a dialog with at least one participant. The processor 120 may produce (or manage) a collaborative task, based on the collected information. After performing operation 1119, the processor 120 may perform operation 609 or operation 611 in FIG. 6.

According to various embodiments, the processor 120 may analyze the collaborative task, and may differently determine the processing method thereof depending on whether any one piece of information in the collaborative task corresponds to a single choice or multiple choices. Since the parameters are information that are for a specific function (e.g., the action) of a specific application (e.g., the domain), the collaboration management module 540 may process the parameters as multiple choices. Although it is illustrated in the drawing that the collection of information is completed only when both the user and the participant consent with the parameters, the collection of information may be completed even if neither the user nor the participant consents with the parameters.

According to various embodiments, the processor 120 may process the parameters as a single choice (e.g., all order items are unified into one) according to configuration of the user who requested the collaborative task. If there is a difference in choices between the user and at least one participant, the processor 120 may repeatedly provide additional questions until the choices match each other. If the additional questions are repeated a predetermined number of times or more, the processor 120 may make a decision by a majority vote between the user and the participant, or may appoint a representative participant through a dialog between the participants so that the appointed representative makes a decision.

Figure 12:
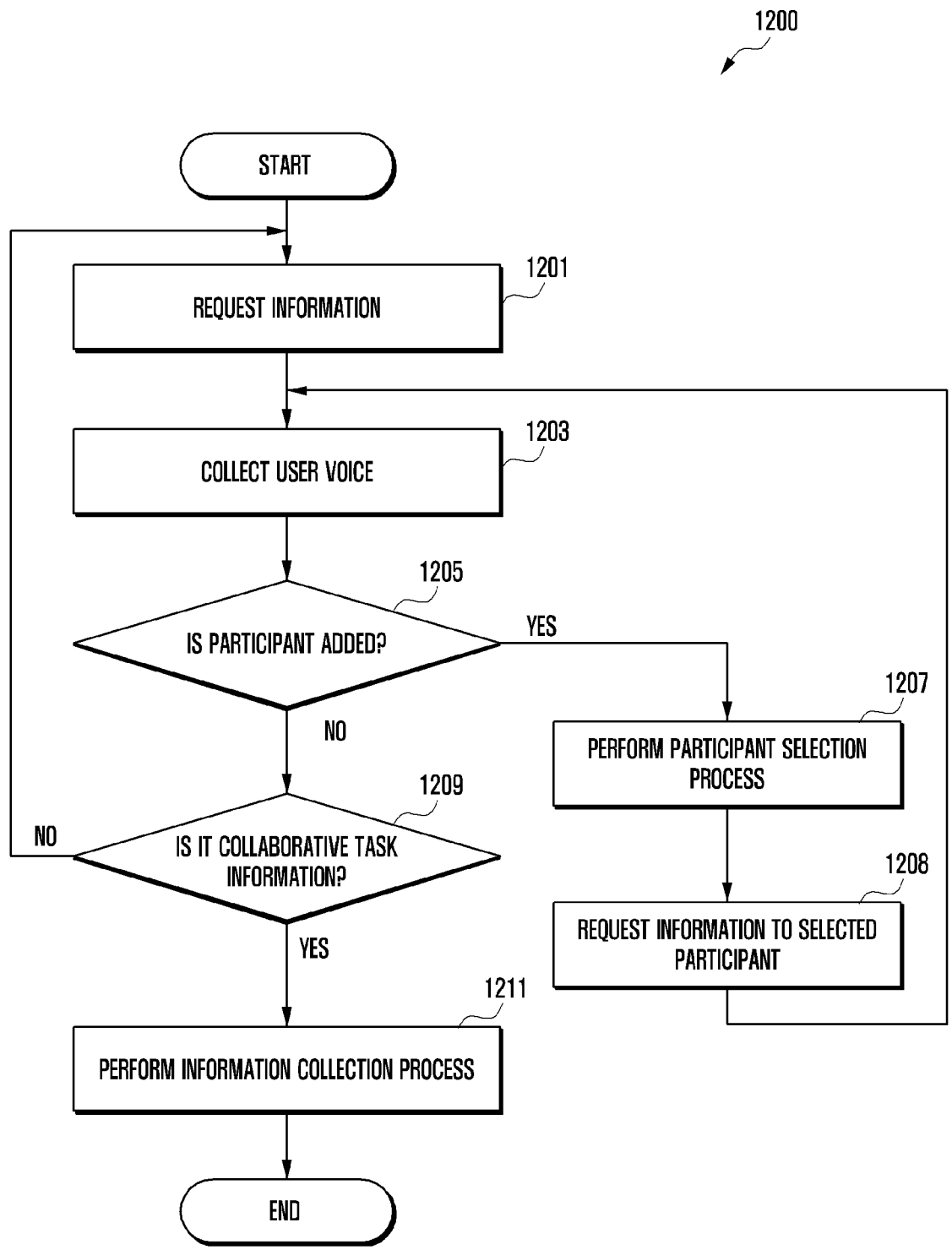
FIG. 12 illustrates a flowchart of a method for adding a participant by an electronic device according to various embodiments.

FIG. 12 illustrates a flowchart 1200 of a method for adding a participant by an intelligent server according to various embodiments.

Referring to FIG. 12, in operation 1201, a processor (e.g., the processor 120 in FIG. 1) (e.g., the collaboration management module 540 in FIG. 5) of an electronic device (e.g., the electronic device 101 in FIG. 1) according to various embodiments may request information related to a collaborative task. The processor 120 may make a request to the user requesting the collaborative task or at least one participant in the collaborative task for information related to the collaborative task. For example, in the case where information for the collaborative task is insufficient, the processor 120 may request information from the user or the electronic device 102 of the participant. The processor 120 may determine whether all information on domains, actions, and parameters related to the collaborative task is collected, and, if all information is not collected, the processor 120 may request information from the user or at least one participant whose information should be collected. The processor 120 may instruct (or control) the user or the electronic device 102 of the participant to provide a user interface or a voice (e.g., a TTS utterance) related to the information request.

In operation 1203, the processor 120 (e.g., the collaboration management module 540) may collect a user voice. The user voice may be received from the user or the electronic device 102 of the participant. The processor 120 may receive a user voice from the user or the electronic device 102, and may convert the received user voice into text data using an automatic speech recognition module (e.g., the automatic speech recognition module 221 in FIG. 2). The processor 120 may analyze a user intention in the user voice, which is converted to the text, using a natural language understanding module (e.g., the natural language understanding module 223 in FIG. 2).

In operation 1205, the processor 120 (e.g., the collaboration management module 540) may determine whether the collected user voice is intended to add a participant. The processor 120 may determine whether information (e.g., domains, actions, and parameters) corresponding to the collected user voice is retrieved from a capsule DB (e.g., the capsule DB 230 in FIG. 2) of the intelligent server 201. If the information corresponding to the collected user voice is retrieved from the capsule DB 230, the processor 120 may determine that the user voice is not intended to add a participant. Alternatively, the processor 120 may determine whether the collected user voice corresponds to contact information stored in the electronic device 101. If the collected user voice corresponds to contact information stored in a memory (e.g., the memory 130 in FIG. 1) of the electronic device 101, the processor 120 may determine that the request is intended to add a participant. If the collected user voice is not retrieved both from the capsule DB 230 and from the contact information stored in the electronic device 101, the processor 120 may determine that the user voice is not intended to add a participant. The processor 120 may perform operation 1207 if it is determined that the user voice is intended to add a participant, and may perform operation 1209 if it is determined that the user voice is not intended to add a participant.

If it is determined that the user voice is intended to add a participant, in operation 1207, the processor 120 (e.g., the collaboration management module 540) may perform a participant selection process. The participant selection process may include an operation of receiving a selected participant from the user. According to various embodiments, the processor 120 may receive a selected participant from at least one participant, based on at least one of the configuration of the electronic device 101, a request by the user, or a request by at least one participant. For example, the participant selection process may include the operations in FIG. 8 or 9. The collaboration management module 540 may perform operation 1208 after performing the participant selection process (e.g., after completing the selection of a participant).

In operation 1208, the processor 120 (e.g., the collaboration management module 540) may request information from the selected participant. The processor 120 may request information related to the collaborative task from at least one participant selected in operation 1207. The information may include at least one of domains, actions, or parameters. The processor 120 may instruct (or control) the electronic device 102 of the selected participant to provide a user interface or a voice (e.g., a TTS utterance) related to the request for information. The processor 120 may return to operation 1203 after requesting the information, and may collect a user voice received from the electronic device 102 of the participant.

If it is determined that the user voice is not intended to add a participant, in operation 1209, the processor 120 (e.g., the collaboration management module 540) may determine whether the collected user voice corresponds to collaborative task information. If information corresponding to the collected user voice is retrieved from the capsule DB 230, the processor 120 may determine that the collected user voice corresponds to the collaborative task information. If information corresponding to the collected user voice is not retrieved from the capsule DB 230, the processor 120 may determine that the collected user voice does not correspond to the collaborative task information. The processor 120 may perform operation 1211 if the collected user voice corresponds to the collaborative task information, and may return to operation 1201 if the collected user voice does not correspond to the collaborative task information. If the user voice (e.g., a user voice of the user or the participant) collected by the request for information is neither addition of a participant nor information related to the collaborative task, the processor 120 may return to operation 1201 to request information again.

In the case where the user voice corresponds to the collaborative task information, in operation 1211, the processor 120 may perform an information collection process. The information collection process may be an operation of collecting information related to the collaborative task. For example, the information collection process may include the operations in FIG. 11.

Figure 13:
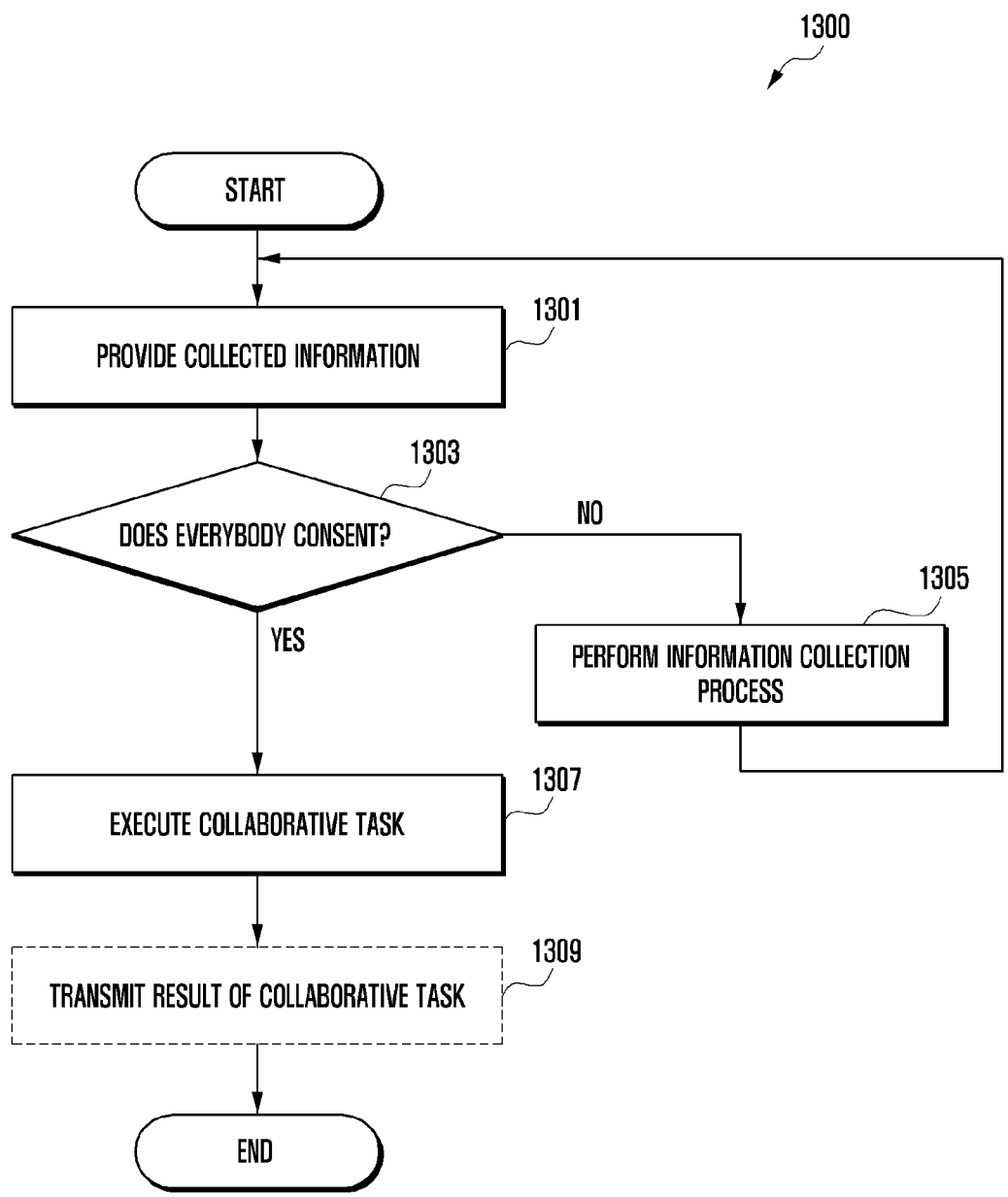
FIG. 13 illustrates a flowchart of a method for executing a collaborative task by an electronic device according to various embodiments.

FIG. 13 illustrates a flowchart 1300 of a method for executing the collaborative task by an intelligent server according to various embodiments.

Referring to FIG. 13, in operation 1301, a processor (e.g., the processor 120 in FIG. 1) (e.g., the collaboration management module 540 in FIG. 5) of an electronic device (e.g., the electronic device 101 in FIG. 1) according to various embodiments may provide collected information. The collaboration management module 540 may provide information collected from the user or an electronic device (e.g., the electronic device 102 in FIG. 1) of at least one participant to the user or the electronic device 102. The collected information may include at least one piece of current command information (e.g., order coffee), request information (e.g., select a coffee item), or dialog history information. The processor 120 may provide the collected information through at least one method of providing template phrases for cases, providing a common template phrase, or displaying a table (e.g., Table 1).

According to various embodiments, the method of providing template phrases for cases may be displaying the collected information using template sentences predefined by service developers. Template phrases may be produced identically or differently for each case (e.g., order coffee or reserve a hotel). For example, the processor 120 may pre-store a template phrase such as "[User] is about to order coffee at [order place] with [at least one participant]" in a memory (e.g., the memory 130 in FIG. 1) or a capsule DB (e.g., the capsule DB 230 in FIG. 2) of an intelligent server (e.g., the intelligent server 201 in FIG. 2). The processor 120 may produce a template phrase using information related to the collaborative task, such as the user, the participants, and the order places. The processor 120 may transmit the produced phrase to the electronic device of at least one participant.

According to various embodiments, the common template phrase may be displayed as a general sentence, based on the information collected so far. For example, the collaboration management module 540 may produce a template phrase such as "[User] is going to do [action] with [at least one participant]. Information determined so far is [collected information]". The collected information indicates the information collected so far, and may be, for example, the parameters (e.g., a glass of mango juice).

According to various embodiments, the method of displaying a table may be displaying information, which is collected so far, in the form of a table. For example, the processor 120 may analyze the collected information, may classify the same into domains, actions, or parameters to be displayed in respective rows, and may display requested information to be distinguished from the collected information (e.g., highlighting).

In operation 1303, the processor 120 (e.g., the collaboration management module 540) may determine whether everybody consents with the collected information. The processor 120 may analyze the collaborative task, and may differently determine the method of processing the same depending on whether any one piece of information (e.g., domains, actions, or parameters) in the collaborative task corresponds to a single choice or multiple choices. Alternatively, the processor 120 may process any one piece of information in the collaborative task as a single choice or multiple choices according to the configuration of the user who requested the collaborative task. The processor 120 may perform operation 1307 if everybody consents with the collected information, and may perform operation 1305 if nobody consents with the collected information.

If nobody consents with the collected information, in operation 1305, the processor 120 (e.g., the collaboration management module 540) may perform an information collection process. The information collection process may be an operation of collecting information related to the collaborative task. For example, the information collection process may include the operations in FIG. 11. If there is a difference in choices between the user and at least one participant, the processor 120 may repeatedly provide additional questions until the choices match each other. If the additional questions are repeated a predetermined number of times or more, the processor 120 may make a decision by a majority vote between the user and the participant, or may appoint a representative participant through a dialog between the participants so that the appointed representative makes a decision. The collaboration management module 540 may perform the information collection process, and may perform operation 1307.

If everybody consents with the collected information, in operation 1307, the processor 120 (e.g., the collaboration execution module 550 in FIG. 5) may execute the collaborative task. The processor 120 may execute the collaborative task, based on the collaborative task produced using information collected by the collaboration management module 540. The processor 120 may provide the collected information to the user or at least one participant, and may receive confirmation for execution of the collaborative task from the user or at least one participant.

In operation 1309, the processor 120 (e.g., the collaboration execution module 550) may transmit a collaborative task result. The processor 120 may provide a collaborative task result to the user or the electronic device 102 of at least one participant. The collaborative task result may be provided through a user interface or a voice. The processor 120 may provide the collaborative task result only to the user in response to a request by the user, instead of providing the collaborative task result to the electronic device 102 of the participant. However, operation 1309 may be omitted in response to a request from the electronic device 101 or the user.

According to various embodiments, the processor 120 may change a representative to perform the collaborative task, based on an input of the user or at least one participant. For example, the processor 120 may configure the user who speaks first as a representative, or may configure a participant other than the user as a representative, based on an input by at least one participant. The processor 120 may transmit information for executing the collaborative task to the electronic device of the representative performing the collaborative task, and may provide a result of execution to the participants other than the representative.

Figure 14:
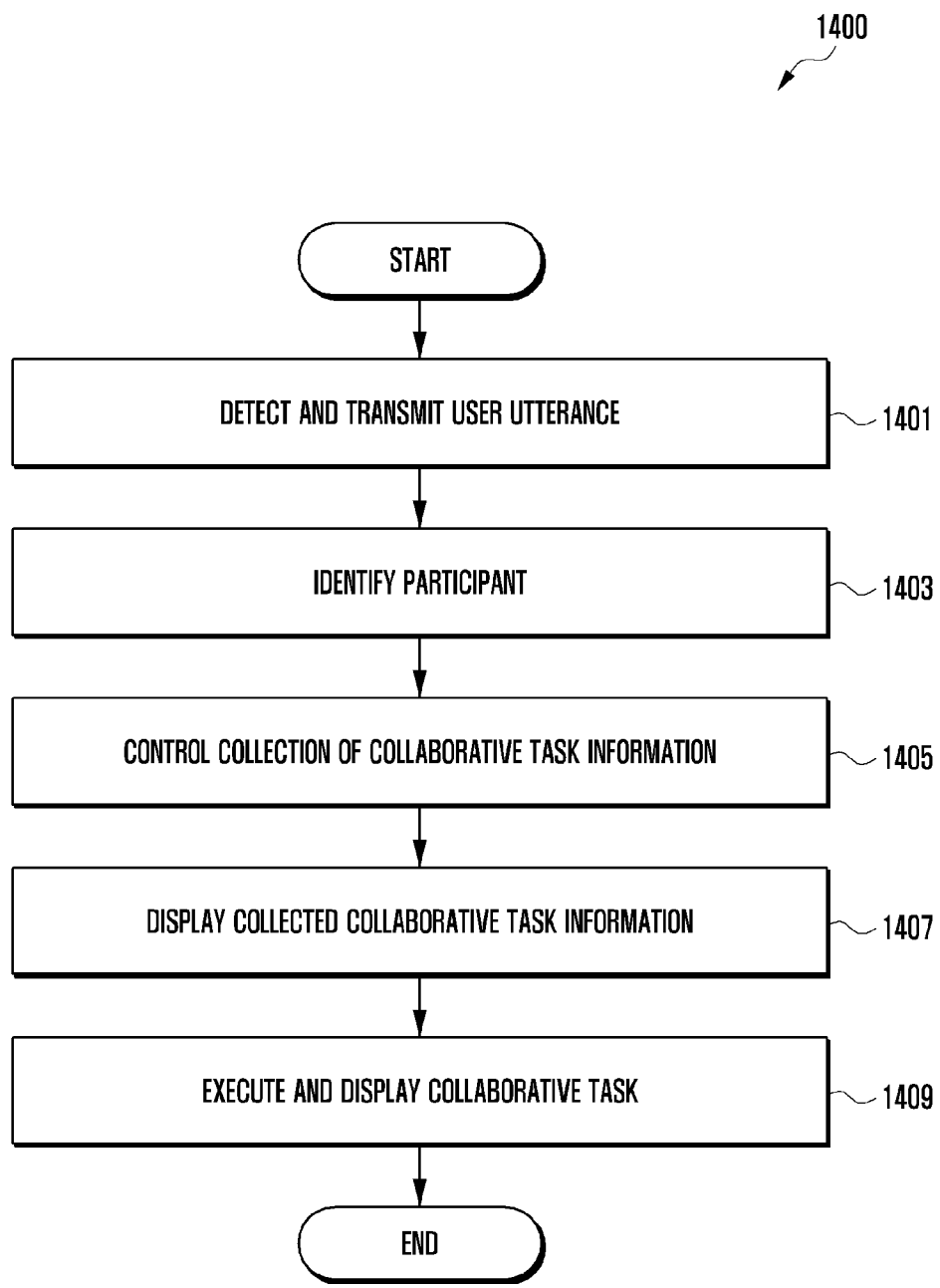
FIG. 14 illustrates a flowchart of a method for operating an electronic device according to various embodiments.

FIG. 14 illustrates a flowchart 1400 of a method for operating an electronic device according to various embodiments.

Referring to FIG. 14, in operation 1401, a processor (e.g., the processor 120 in FIG. 1) of an electronic device (e.g., the electronic device 101 in FIG. 1) according to various embodiments may detect a user utterance, and may transmit the same to an intelligent server (e.g., the intelligent server 201 in FIG. 2). The processor 120 may receive a voice input using a client module (e.g., the client module 137 in FIG. 2). For example, the client module 137 may receive a voice signal corresponding to the user utterance detected through a microphone (e.g., the input device 150 in FIG. 1 or the microphone 151 in FIG. 2). The client module 137 may transmit the received voice input to the intelligent server 201 through a communication module (e.g., the communication module 190 in FIG. 1).

In operation 1403, the processor 120 may identify a participant. When a request for identifying or selecting a participant is received from the intelligent server 201, the processor 120 may display a user interface on a display (e.g., the display device 160 in FIG. 1), or may output a voice through a speaker (e.g., the sound output device 155 in FIG. 1). The user interface may include at least one of text, images, and videos. For example, the user interface may include any one of participant information (e.g., phone numbers, names, etc.) for confirmation of the participants, a participant list including at least one piece of participant information, or a contact list stored in the electronic device 101. The processor 120 may receive a voice signal (e.g., "Is the participant Mark?) from the intelligent server 201, and may output the voice signal through the speaker. The voice signal may be a speech converted from text by the intelligent server 201. The processor 120 may provide a response to the request for confirmation or selection of a participant (e.g., confirmation of a participant (e.g., Yes, correct) or selection of a participant (e.g., He is Jack)) to the intelligent server 201.

In operation 1405, the processor 120 may perform control to collect collaborative task information. The processor 120 may receive a request for information related to the collaborative task from the intelligent server 201, and may display a user interface in response to the request on the display device 160, or may output a voice through the sound output device 155. The processor 120 may receive, from the intelligent server 201, an instruction to make a request to at least one participant for information. The processor 120 may transmit a user interface or a voice signal according to a request for information related to the collaborative task to the electronic device 102 of the participant.

In operation 1407, the processor 120 may display the collected collaborative task information. The processor 120 may receive information collected in relation to the collaborative task from the intelligent server 201, and may display a user interface including the received information on the display device 160, or may output a voice through the sound output device 155. The collected information may be displayed by at least one method of providing template phrases for cases, providing a common template phrase, or displaying a table (e.g., Table 1). The processor 120 may receive, from the intelligent server 201, a request for transmitting the collected information to at least one participant. The processor 120 may transmit a user interface or a voice signal including the collected information to the electronic device 102 of the participant.

In operation 1409, the processor 120 may execute the collaborative task, and may display the result thereof. The processor 120 may execute the collaborative task under the control of the intelligent server 201, and may provide the execution result through a user interface or a voice. The processor 120 may transmit the execution result to the electronic device 102 of the participant, based on a user request or a request of the intelligent server 201.

FIG. 15 illustrates a diagram of an example in which an electronic device receives a user voice for a collaborative task according to various embodiments.

Referring to FIG. 15, a processor (e.g., the processor 120 in FIG. 1) of an electronic device (e.g., the electronic device 101 in FIG. 1) according to various embodiments may provide at least one of a first user interface 1510 to a fourth user interface 1570 in response to a detected user voice. The first user interface 1510 may be displayed on a display (e.g., the display device 160 in FIG. 1) when a user voice including a collaborative pattern (e.g., a participant (e.g., Mark), coffee, and order) is received. The second user interface 1530 may be displayed on the display device 160 when a user voice including a collaborative pattern (e.g., a participant (e.g., Mark) and coffee) is received. The third user interface 1550 may be displayed on the display device 160 when a user voice is received together with a user input 1551 for the collaborative task.

The user input 1551 may be selection of a virtual button displayed on the display device 160, and may be intended to cause the intelligent server 201 to recognize the collaborative task when the virtual button is selected along with the user utterance. The fourth user interface 1570 may be displayed on the display device 160 when a user voice intended for collaboration (e.g., a participant) is received. The processor 120 may transmit the user voice or the user input 1551 to the intelligent server 201 through a communication module (e.g., the communication module 190 in FIG. 1) while displaying any one of the first user interface 1510 to the fourth user interface 1570.

Figure 16A:
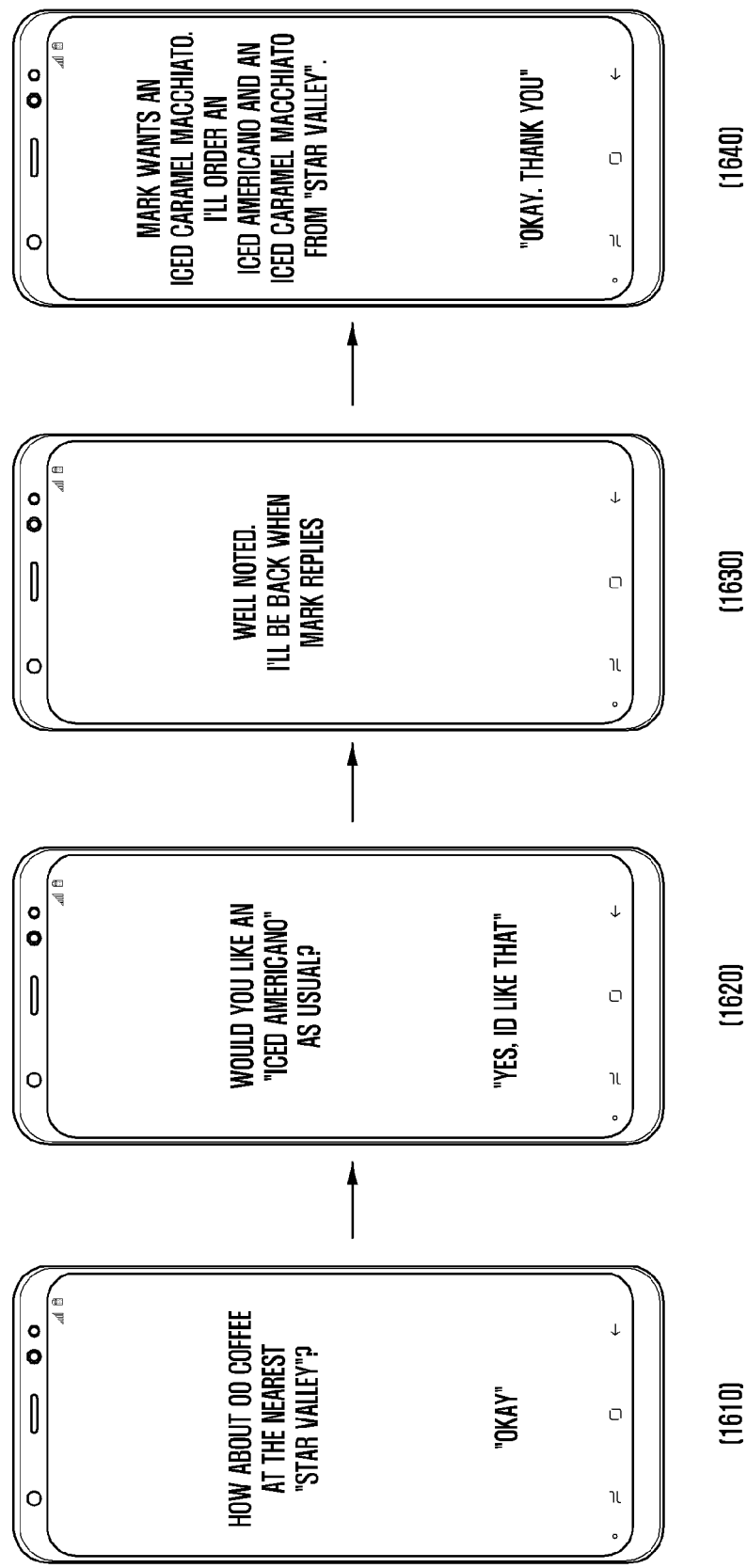
FIG. 16A illustrates a diagram of an example for providing a user interface related to a user voice of an electronic device according to various embodiments.

FIG. 16A illustrates a diagram of an example for providing a user interface related to a user voice of an electronic device according to various embodiments.

Referring to FIG. 16A, a processor (e.g., the processor 120 in FIG. 1) of an electronic device (e.g., the electronic device 101 in FIG. 1) according to various embodiments may provide a first user interface 1610 after receiving a user voice for the collaborative task. The processor 120 may display first recommendation information (e.g., "How about OO coffee at the nearest 'Star Valley'?") that recommends the order place (e.g., Star Valley), based on the user history recorded in a coffee order application, on a display (e.g., the display device 160 in FIG. 1). The processor 120 may convert the text of the first recommendation information into a voice, and output the same through a speaker (e.g., the sound output device 155 in FIG. 1). The processor 120 may receive a first user response (e.g., "Okay") to the first recommendation information, may display the received first user response on the display device 160, and may transmit the same to the intelligent server 201 through a communication module (e.g., the communication module 190 in FIG. 1).

The processor 120 may provide a second user interface 1620, based on the first user response. The processor 120 may display second recommendation information (e.g., "Would you like an 'iced Americano' as usual?") that recommends a coffee item (e.g., iced Americano), based on the user history recorded in the coffee order application, on the display device 160. The processor 120 may convert the text for the second recommendation information into a voice, and may output the same through the sound output device 155. The processor 120 may receive a second user response (e.g., "Yes, I'd like that") to the recommendation information, may display the received second user response on the display device 160, and may transmit the same to the intelligent server 201 through the communication module 190.

The processor 120 may provide a third user interface 1630, based on the second user response. The processor 120 may determine that collection of the information (e.g., domains (e.g., order coffee), actions (e.g., Star Valley), and parameters (e.g., iced Americano)) for the collaborative task from the user is completed according to the instruction (or control) of the intelligent server 201. The processor 120 may provide a third user interface 1630 for collecting information from a participant (e.g., Mark) participating in the collaborative task. The processor 120 may display the third user interface 1630 on the display device 160, or may convert text (e.g., "Well noted. ~) included in the third user interface 1630 into a voice, and may output the same through the sound output device 155.

When the collection of the information from the participant is completed, the processor 120 may provide a fourth user interface 1640. When the collection of the information from the user and at least one participant is completed, the processor 120 may provide the fourth user interface 1640 according to the instruction (or control) of the intelligent server 201. For example, the intelligent server 201 may instruct (or control) to provide a fourth user interface 1640 to the electronic device 101 after providing a sixth user interface 1660 shown in FIG. 16B to the electronic device 102 of the participant. The processor 120 may display the fourth user interface 1640 on the display device 160, or may convert text included in the fourth user interface 1640 (e.g., Mark wants an iced caramel macchiato ~) into a voice, and may output the same through the sound output device 155. The processor 120 may complete the order of coffee in the coffee order application, based on the user's confirmation (e.g., "Okay, thank you").

Figure 16B:
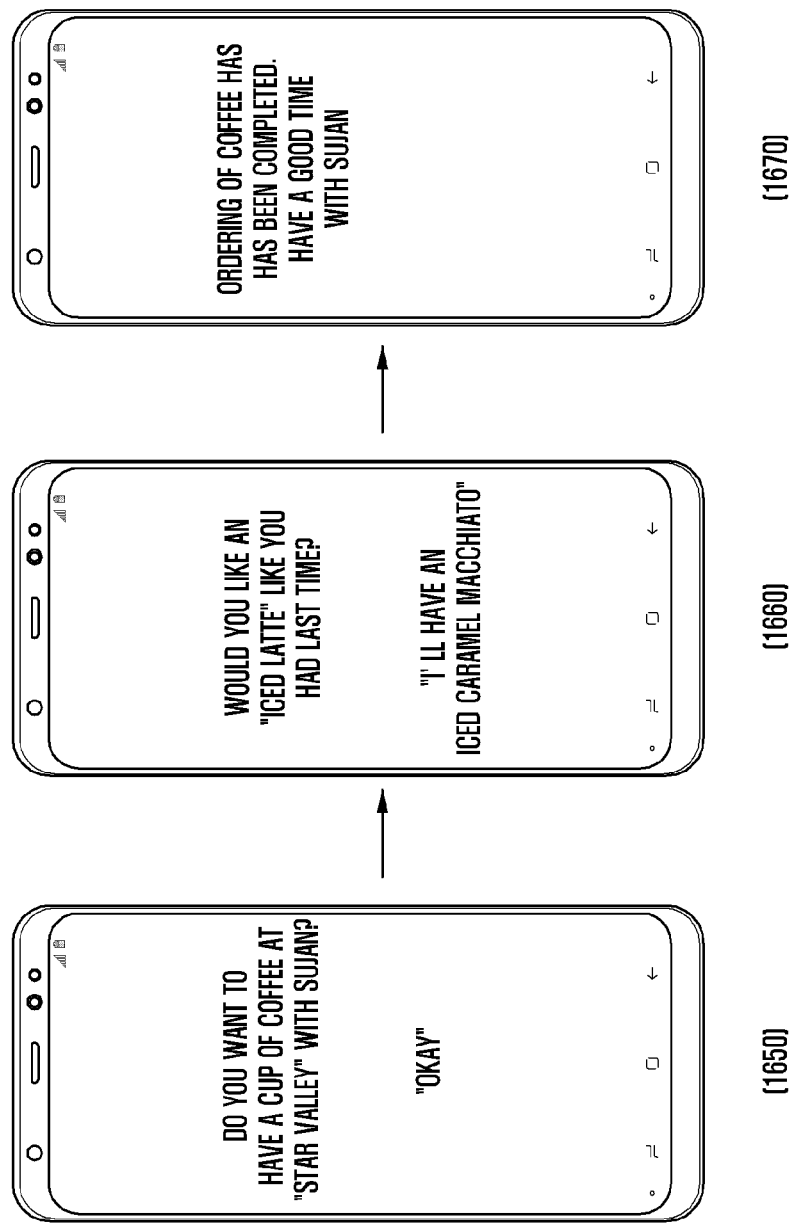
FIG. 16B illustrates a diagram of an example for providing a user interface related to a participant voice of an electronic device according to various embodiments.

FIG. 16B illustrates a diagram of an example for providing a user interface related to a participant voice of an electronic device according to various embodiments.

Referring to FIG. 16B, an electronic device (e.g., the electronic device 102 in FIG. 1) according to various embodiments may provide a fifth user interface 1650 including the collaborative task information. The electronic device 102 may indicate the electronic device of a participant to participate in the collaborative task with the user of the electronic device 101. Hereinafter, although a description will be made based on the electronic device 102 in order to avoid confusion with FIG. 16A, in the case where the user becomes a participant, the operations included in FIG. 16B may be performed by the processor 120 of the electronic device 101. The electronic device 102 may receive collaborative task information (e.g., "Do you want to have a cup of coffee at "Star Valley" with Sujan?") from the intelligent server 201 or the electronic device 101 of the user, and may display the received collaborative task information, or may output a voice corresponding to the collaborative task.

According to various embodiments, in the case where the electronic device 102 provides a voice agent function, the intelligent server 201 may provide the electronic device 102 with the collaborative task information in the form of text. The electronic device 102 may convert the text corresponding to the collaborative task information into a voice using a voice agent function, and may output the same. Alternatively, in the case where the electronic device 102 does not provide a voice agent function, the intelligent server 201 may provide link information including collaborative task information to the electronic device 102. The electronic device 102 may display the link information, and if the link information is selected by the participant, may display a web page including the collaborative task information. Alternatively, the electronic device 102 may output a voice corresponding to the collaborative task information. The electronic device 102 may receive a participant response to the collaborative task information, and may transmit the same to the intelligent server 201. The fifth user interface 1650 may be provided after the electronic device 101 provides the first user interface 1610.

According to various embodiments, the electronic device 102 may provide a sixth user interface 1660 including a request for information. The electronic device 102 may display first recommendation information (e.g., "Would you like an 'iced latte' like you had last time?") that recommends coffee items (e.g., iced latte), based on the usage history of the participant recorded in the coffee order application, or may output a voice corresponding to the first recommendation information. The electronic device 102 may receive a first participant response (e.g., "I'll have an iced caramel macchiato") to the first recommendation information, may display the received first participant response, and may transmit the same to the intelligent server 201 or the electronic device 101.

According to various embodiments, the electronic device 102 may provide a seventh user interface 1670 including collaborative task complete information. The electronic device 102 may determine that all information for the collaborative task with the user has been collected according to the instruction (or control) of the intelligent server 201. The electronic device 102 may receive text or a voice corresponding to the collaborative task complete information (e.g., "Ordering of coffee has been completed" ~) from the intelligent server 201. For example, the intelligent server 201 may instruct the electronic device 101 of the user to provide the fourth user interface 1640 shown in FIG. 16A, and may instruct (or control) to provide the seventh user interface 1670 to the electronic device 102. The electronic device 102 may display the seventh user interface 1670, or may output a voice corresponding to the collaborative task complete information.

A method of operating an electronic device (e.g., the electronic device 101 in FIG. 1) according to various embodiments may include: receiving a user voice from a user, analyzing the received user voice to determine whether to perform a collaborative task, if the collaborative task is determined to be performed, selecting at least one participant related to the collaborative task, collecting information related to the collaborative task from the user or an electronic device (e.g., the electronic device 102 in FIG. 1) of the selected participant, and performing the collaborative task, based on the collected information.

The determining may include converting the user voice into text data, determining whether the converted text data matches a collaborative pattern stored in the memory of the electronic device, and if the converted text data matches the collaborative pattern, determining to perform the collaborative task.

The determining may include converting the user voice into text data, performing natural language understanding on the converted text data, determining whether the intention of the user identified through the natural language understanding corresponds to an action intended for collaboration, and if the intention of the user corresponds to the action intended for collaboration, determining to perform the collaborative task.

The method may further include obtaining contact information of the selected participant from the user, based on the contact information of the participant, identifying whether the electronic device of the participant provides a voice agent function, and if the electronic device of the participant does not provide the voice agent function, transmitting a message including link information for providing the voice agent function to the electronic device of the participant.

The collecting may include collecting the information related to the collaborative task, based on the user voice received from the user, providing the collected information to the electronic device of the participant, and correcting the information related to the collaborative task, based on the participant input.

The information related to the collaborative task may include at least one of domains, actions, or parameters.

Various embodiments of the disclosure disclosed in the specification and drawings are provided as specific examples to facilitate easy explanation of the technical concept of the disclosure and a better understanding of the disclosure, and are not intended to limit the scope of the disclosure. Therefore, the scope of the disclosure should be construed to encompass all changes or modifications derived from the technical idea of the disclosure, as well as the embodiments disclosed herein.

What is claimed is:

1. An electronic device comprising:
   a speech recognition module;
   a memory configured to store information corresponding to a plurality of domains related to a collaborative task; and
   a processor operatively connected to the speech recognition module and the memory, wherein the processor is configured to:
   receive a user voice from a user,
   analyze the received user voice using the speech recognition module to convert the user voice into text data,
   determine whether the converted text data matches a collaborative pattern stored in the memory,
   if the converted text data matches the collaborative pattern, determine to perform the collaborative task,
   based on the collaborative task, select at least one participant related to the collaborative task from a contact list stored in the memory,
   collect information related to the collaborative task from the user or an electronic device of the selected participant,
   generate the collaborative task corresponding to a collaborative task production method, based on the collected information, and
   perform the generated collaborative task,
   wherein the collected information comprises at least one of domains, actions, or parameters, the domains indicate an application installed in the electronic device, the actions indicate specific functions to be performed in the applications, the parameters is information that is used to perform the specific functions in the applications, and
   wherein the collaborative task production method comprises at least one of a first method in which the selected participant corrects the collaborative task, based on the user voice, a second method in which the user and the selected participant input the collaborative task, respectively, or a third method in which the user and the selected participant interact to configure the collaborative task.

2. The electronic device of claim 1, wherein the processor is further configured to:
   convert the user voice into text data,
   perform natural language understanding on the converted text data,
   determine whether an intention of the user, identified through the natural language understanding, corresponds to an action intended for collaboration, and
   if the intention of the user corresponds to the action intended for collaboration, determine to perform the collaborative task.

3. The electronic device of claim 1, wherein the processor is further configured to:
   select the participant by receiving a user input for selecting the participant from the user.

4. The electronic device of claim 1, wherein the processor is further configured to:
   obtain contact information of the selected participant from the memory,
   based on the contact information of the participant, identify whether the electronic device of the participant provides a voice agent function, and
   if the electronic device of the participant does not provide the voice agent function, transmit a message comprising link information for providing the voice agent function to the electronic device of the participant.

5. The electronic device of claim 1, wherein the processor is further configured to transmit a user interface or a voice signal for collecting the information related to the collaborative task to the electronic device of the selected participant.

6. The electronic device of claim 1, wherein the processor is further configured to obtain the information related to the collaborative task through a voice or a user input from the user, or the electronic device of the selected participant.

7. The electronic device of claim 1, wherein the processor is further configured to:
   obtain collaborative task information of the user, or obtain collaborative task information of the participant from the user.

8. The electronic device of claim 1, wherein the processor is further configured to:
collect the information related to the collaborative task, based on the user voice received from the user,
provide the collected information to the electronic device of the participant, and
correct the information related to the collaborative task, based on an input from the participant.

9. The electronic device of claim 1, wherein the processor is further configured to:
collect first information related to the collaborative task, based on the user voice received from the user,
collect second information related to the collaborative task from the electronic device of the participant, and
produce the collaborative task using the first information and the second information.

10. The electronic device of claim 1, wherein the processor is further configured to collect the information related to the collaborative task through interaction between the user and the electronic device of the participant.

11. The electronic device of claim 1, wherein the processor is further configured to:
analyze the collaborative task to identify whether any one piece of information related to the collaborative task corresponds to a single choice or multiple choices, and
determine a method of collecting information, based on the identification.

12. The electronic device of claim 1, wherein to provide the collected information the processor is configured to provide template phrases for cases, provide a common template phrase, or display a table.

13. The electronic device of claim 1, wherein the processor is further configured to provide a result of executing the collaborative task to the user or transmit the result of executing the collaborative task to the electronic device of the participant.

14. A method of operating an electronic device, the method comprising:
receiving a user voice from a user,
analyzing the received user voice to convert the user voice into text data,
determining whether the converted text data matches a collaborative pattern stored in a memory,
if the converted text data matches the collaborative pattern, determining to perform a collaborative task,
based on the collaborative task, selecting a participant related to the collaborative task from a contact list stored in the memory,
collecting information related to the collaborative task from the user or an electronic device of the selected participant,
generating the collaborative task corresponding to a collaborative task production method, based on the collected information, and
performing the generated collaborative task,
wherein the collected information comprises at least one of domains, actions, or parameters, the domains indicate an application installed in the electronic device, the actions indicate specific functions to be performed in the applications, the parameters is information that is used to perform the specific functions in the applications, and
wherein the collaborative task production method comprises at least one of a first method in which the selected participant corrects the collaborative task, based on the user voice, a second method in which the user and the selected participant input the collaborative task, respectively, or a third method in which the user and the selected participant interact to configure the collaborative task.

* * * * *